(12) United States Patent
Li et al.

(10) Patent No.: US 10,996,440 B2
(45) Date of Patent: May 4, 2021

(54) CAMERA LENS ASSEMBLY

(71) Applicant: ZHEJIANG SUNNY OPTICAL CO., LTD., Ningbo (CN)

(72) Inventors: Ming Li, Ningbo (CN); Kaiyuan Zhang, Ningbo (CN); Wendi Liu, Ningbo (CN)

(73) Assignee: ZHEJIANG SUNNY OPTICAL CO., LTD., Ningbo (CN)

( * ) Notice: Subject to any disclaimer, the term of this patent is extended or adjusted under 35 U.S.C. 154(b) by 195 days.

(21) Appl. No.: 16/226,959

(22) Filed: Dec. 20, 2018

(65) Prior Publication Data

US 2019/0121099 A1 Apr. 25, 2019

Related U.S. Application Data

(63) Continuation of application No. PCT/CN2018/084224, filed on Apr. 24, 2018.

(30) Foreign Application Priority Data

Sep. 18, 2017 (CN) .......................... 201710838881.8
Sep. 18, 2017 (CN) .......................... 201721190566.0

(51) Int. Cl.
*G02B 9/62* (2006.01)
*G02B 13/00* (2006.01)

(52) U.S. Cl.
CPC .......... *G02B 13/0045* (2013.01); *G02B 9/62* (2013.01); *G02B 13/00* (2013.01)

(58) Field of Classification Search
CPC ....... G02B 13/0045; G02B 9/62; G02B 13/00
(Continued)

(56) References Cited

U.S. PATENT DOCUMENTS 9,083,885 B1 * 7/2015 Chen .................. H04N 5/23296
2010/0053776 A1 * 3/2010 Tanaka ..................... G02B 9/60
359/793

(Continued)

FOREIGN PATENT DOCUMENTS

CN 1924632 A 3/2007
CN 101846786 A 9/2010

(Continued)

OTHER PUBLICATIONS

PCT International Search Report and Written Opinion completed by the ISA/CN dated Jul. 27, 2018 and issued in connection with PCT/CN2018/084224.

*Primary Examiner* — James R Greece
(74) *Attorney, Agent, or Firm* — Barnes & Thornburg LLP

(57) ABSTRACT

The present disclosure discloses a camera lens assembly. The camera lens assembly sequentially includes, from an object side to an image side: an alignment group, having a positive refractive power and including at least one lens, a lens closest to the object side in the alignment group having a positive refractive power; and a fixing group, having a refractive power and including at least one lens, a lens closest to the image side in the fixing group having a negative refractive power. An effective focal length fa of the alignment group and an effective focal length f of the camera lens assembly satisfy: 0.6<fa/f<2.0. The camera lens assembly of the present disclosure includes an automatic alignment group and a fixing group, which can realize the alignment function by grouping lenses, thereby improving the module process yield and shortening the AF duration.

14 Claims, 7 Drawing Sheets

(58) Field of Classification Search
USPC .................................................. 359/708, 713
See application file for complete search history.

(56) References Cited

U.S. PATENT DOCUMENTS

| | | |
|---|---|---|
| 2012/0099210 A1 | 4/2012 | Huang et al. |
| 2015/0198791 A1* | 7/2015 | Kubota .............. G02B 13/0045 359/689 |
| 2015/0277085 A1* | 10/2015 | Noda ................. G02B 13/0045 359/713 |
| 2016/0085058 A1 | 3/2016 | Chae |
| 2016/0139372 A1 | 5/2016 | Tanaka |
| 2016/0231533 A1* | 8/2016 | Mercado .............. H04N 5/2254 |
| 2016/0341934 A1* | 11/2016 | Mercado .............. H04N 5/2254 |
| 2016/0370560 A1 | 12/2016 | Kubota et al. |
| 2016/0377841 A1* | 12/2016 | Kubota ................... G02B 9/64 359/755 |

FOREIGN PATENT DOCUMENTS

| | | |
|---|---|---|
| CN | 102047165 A | 5/2011 |
| CN | 102455483 A | 5/2012 |
| CN | 102495457 A | 6/2012 |
| CN | 204065539 U | 12/2014 |
| CN | 104950424 A | 9/2015 |
| CN | 105829942 A | 8/2016 |
| CN | 107102425 A | 8/2017 |
| CN | 206930824 U | 1/2018 |

* cited by examiner

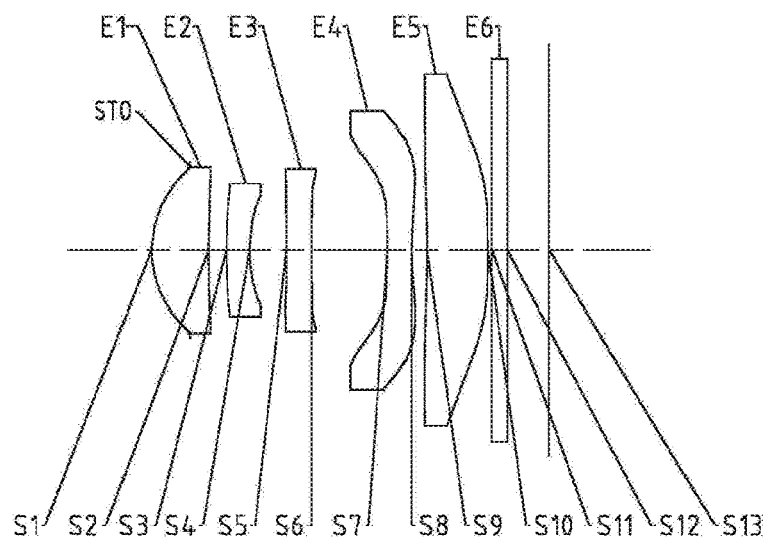
Fig. 1
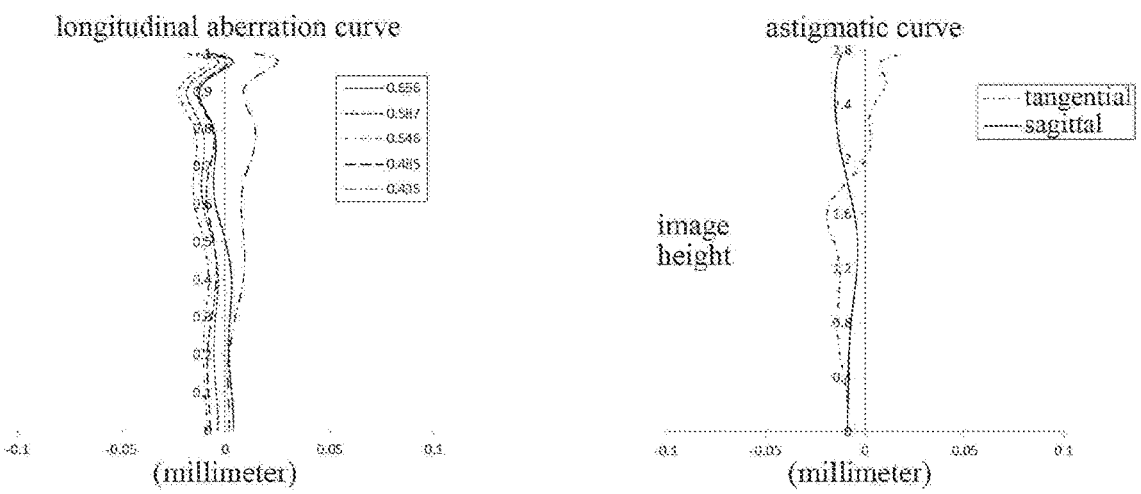
Fig. 2
Fig. 3
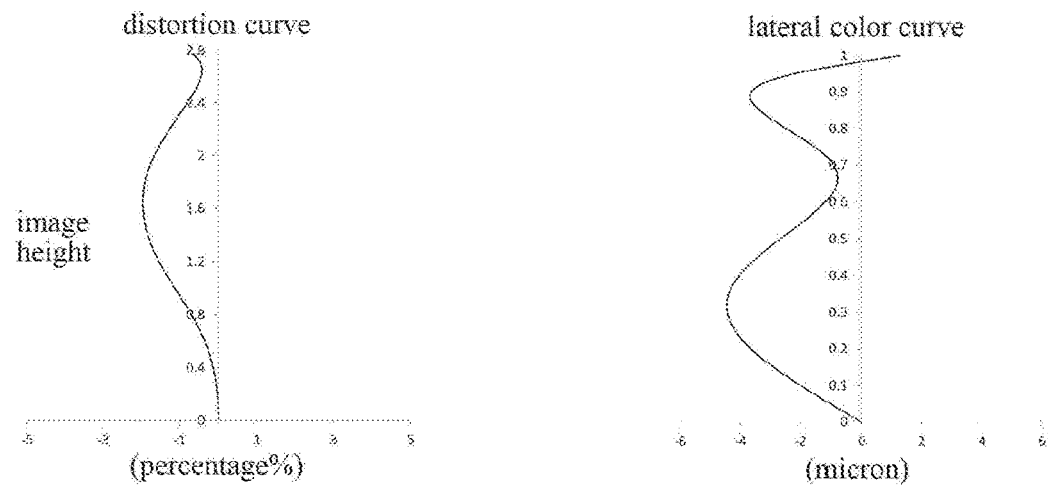
Fig. 4
Fig. 5

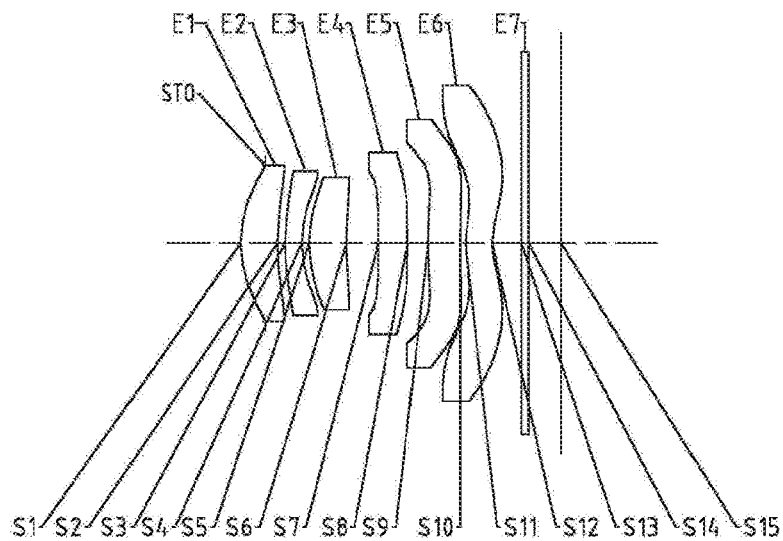
Fig. 6
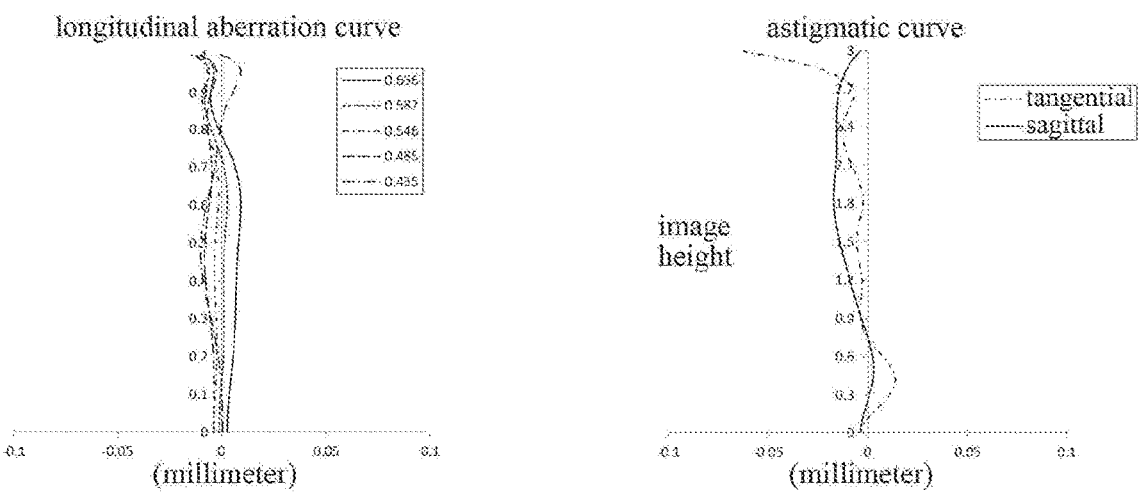
Fig. 7
Fig. 8
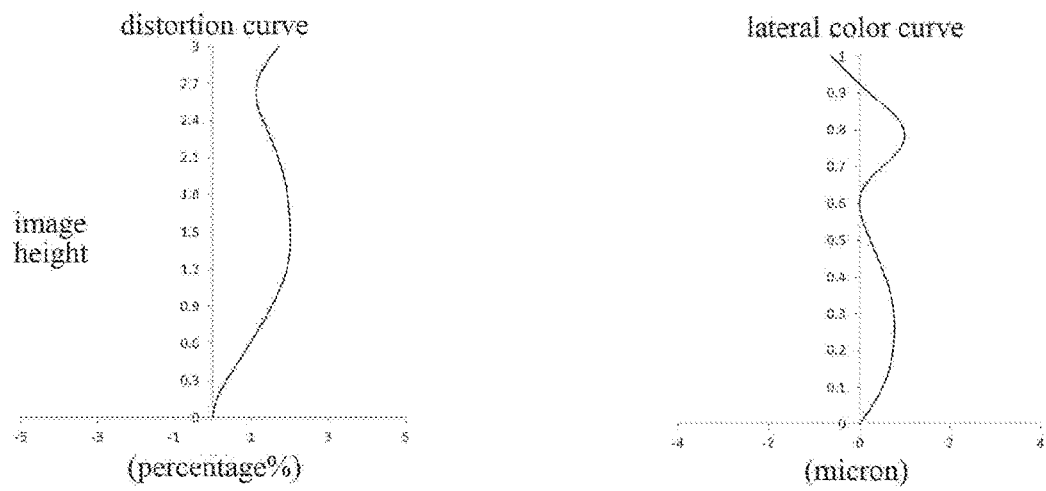
Fig. 9
Fig. 10

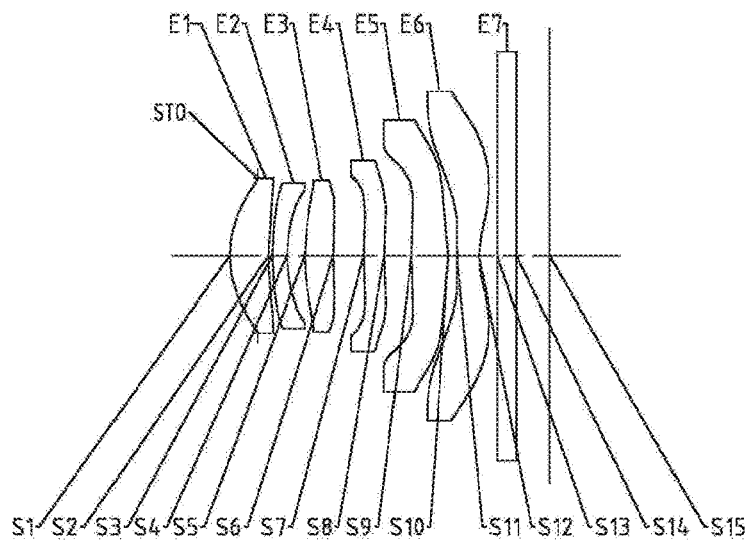
Fig. 11
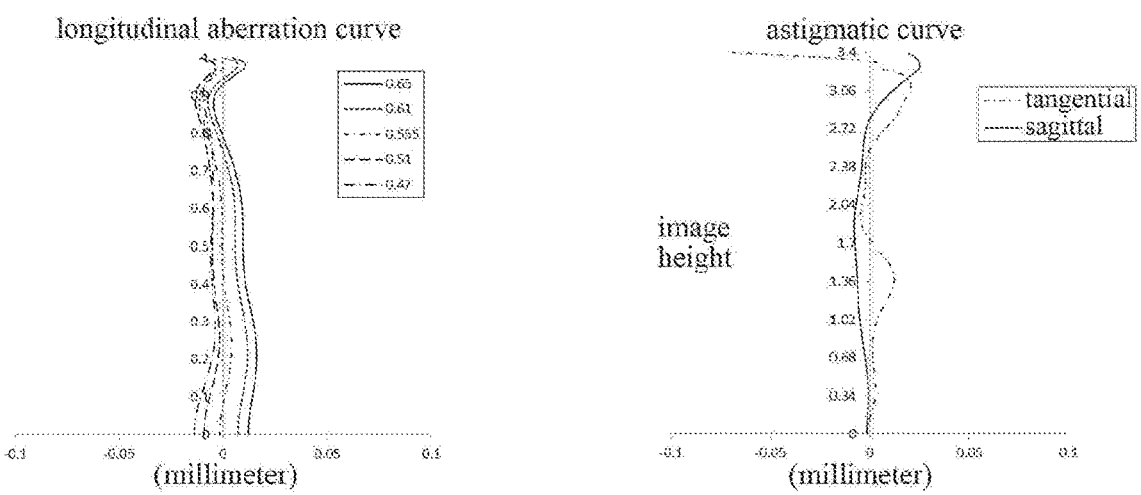
Fig. 12
Fig. 13
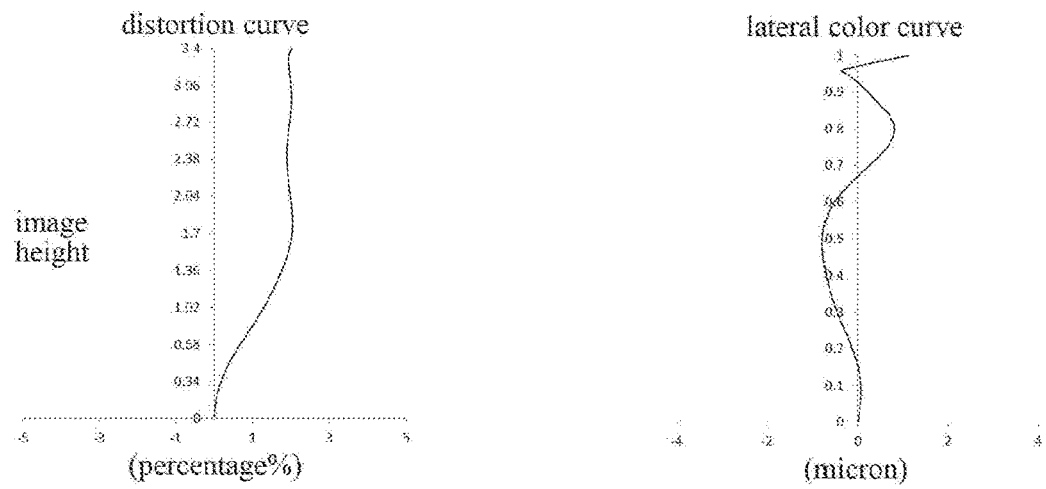
Fig. 14
Fig. 15

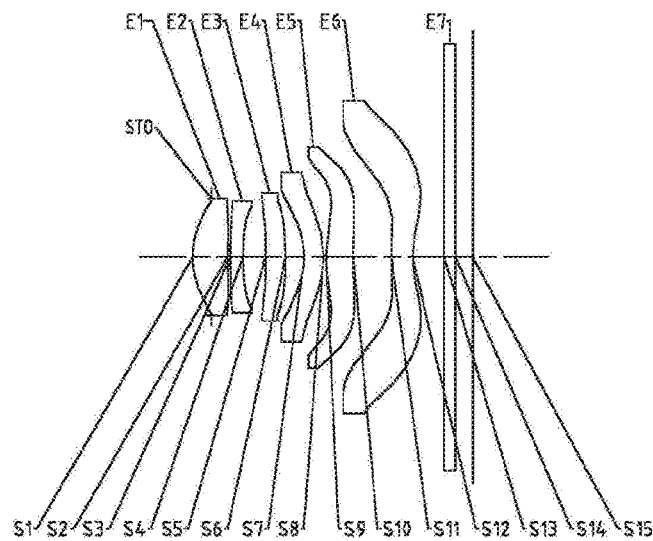
Fig. 16
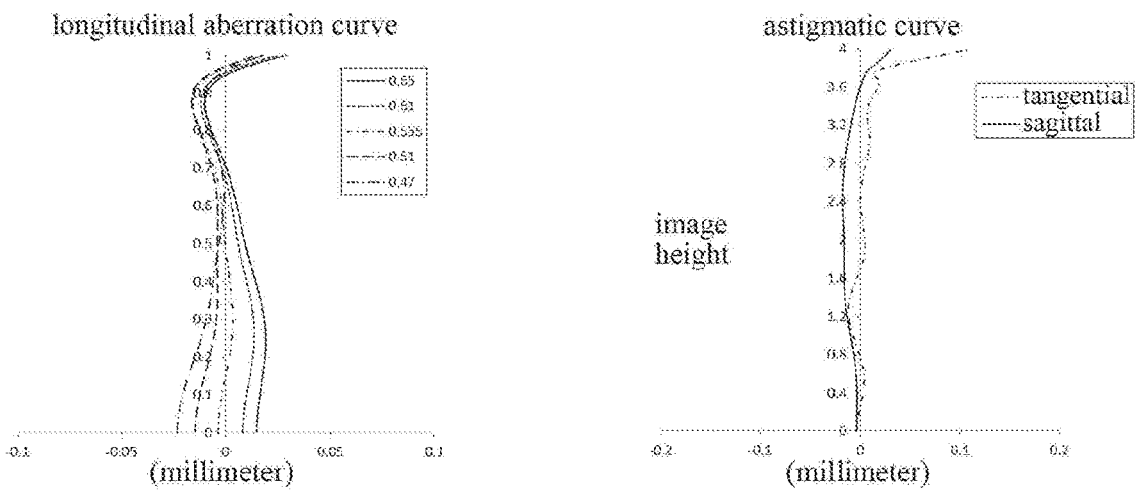
Fig. 17
Fig. 18
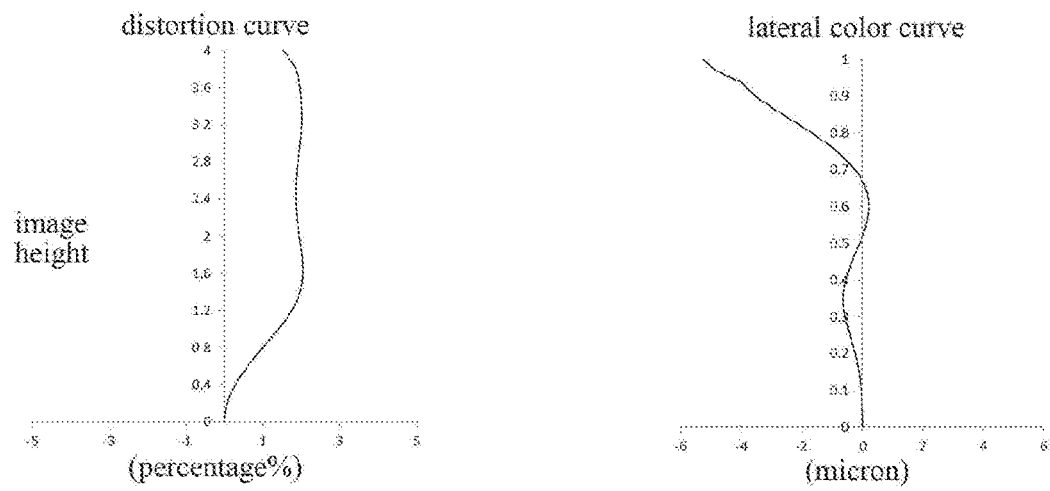
Fig. 19
Fig. 20

CAMERA LENS ASSEMBLY

CROSS-REFERENCE TO RELATED APPLICATIONS

This application is a continuation of International Application No. PCT/CN2018/084224, filed on Apr. 24, 2018, which claims priorities and rights to Chinese Patent Application No. 201710838881.8 filed with the China National Intellectual Property Administration (CNIPA) on Sep. 18, 2017 and Chinese Patent Application No. 201721190566.0 filed with the CNIPA on Sep. 18, 2017, the disclosures of which are hereby incorporated by reference in their entireties.

TECHNICAL FIELD

The present disclosure relates to a camera lens assembly, and more specifically to a camera lens assembly having an automatic alignment group.

BACKGROUND

At present, commonly used photosensitive elements in optical systems include charge-coupled devices (CCD) and complementary metal-oxide semiconductor elements (CMOS). With the improvement on performance and reduction in size of the commonly used photosensitive elements, higher requirements on high imaging quality and miniaturization of the counterpart camera lens assemblies have been brought forward. At the same time, people have higher requirements on the imaging quality of portable electronic products, and electronic products such as mobile phones and tablet computers become thinner, and smaller in sizes, also demanding the high imaging quality and miniaturization of the camera lens assemblies.

A conventional high-pixel lens assembly adopts the active alignment technology, and the entire camera lens assembly needs to be corrected when performing the alignment. Therefore, the conventional active alignment technology imposes limitations on improving the product yield and is not conducive to achieving a good imaging effect. In order to further improve the module process yield and shorten the auto focus (AF) duration, the present invention provides a camera lens assembly having an automatic alignment group and a fixing group that realizes the alignment by grouping lenses.

SUMMARY

To solve at least some of the problems in the existing technology, the present disclosure provides a camera lens assembly.

According to an aspect, the present disclosure provides a camera lens assembly. The camera lens assembly sequentially includes, from an object side to an image side of the camera lens assembly: an alignment group, having a positive refractive power and including at least one lens, a lens closest to the object side in the alignment group having a positive refractive power; and a fixing group, having a refractive power and including at least one lens, a lens closest to the image side in the fixing group having a negative refractive power. An effective focal length fa of the alignment group and an effective focal length f of the camera lens assembly satisfy: $0.6 < fa/f < 2.0$.

According to an embodiment of the present disclosure, an entrance pupil diameter EPD of the camera lens assembly and the effective focal length f of the camera lens assembly satisfy: $1.6 \leq f/EPD \leq 2.8$.

According to an embodiment of the present disclosure, an edge thickness ETa between the alignment group and the fixing group at positions where radiuses are maximum satisfies: $0.15 \text{ mm} < ETa < 0.5 \text{ mm}$.

According to an embodiment of the present disclosure, the effective focal length f of the camera lens assembly and an axial distance TTL from an object-side surface of a positive lens closest to the object side in the alignment group to an image plane satisfy: $0.8 \leq f/TTL \leq 1.2$.

According to an embodiment of the present disclosure, the effective focal length f of the camera lens assembly and an effective focal length fb of the fixing group satisfy: $f/|fb| \leq 1.0$.

According to an embodiment of the present disclosure, the effective focal length f of the camera lens assembly and an effective focal length fbi of a negative lens closest to the image side in the fixing group satisfy: $-2.0 < f/fbi < 0$.

According to an embodiment of the present disclosure, a dispersion coefficient V1 of the positive lens closest to the object side in the alignment group and a dispersion coefficient V2 of a negative lens adjacent to the positive lens satisfy: $0.5 < V1/(V1+V2) < 1$.

According to another aspect, the present disclosure provides a camera lens assembly. The camera lens assembly sequentially includes, from an object side to an image side of the camera lens assembly: an alignment group, having a positive refractive power and including at least one lens, a lens closest to the object side in the alignment group having a positive refractive power; and a fixing group, having a refractive power and including at least one lens, a lens closest to the image side in the fixing group having a negative refractive power. A dispersion coefficient V1 of a positive lens closest to the object side in the alignment group and a dispersion coefficient V2 of a negative lens adjacent to the positive lens satisfy: $0.5 < V1/(V1+V2) < 1$.

According to another aspect, the present disclosure provides a camera lens assembly. The camera lens assembly sequentially includes, from an object side to an image side of the camera lens assembly: an alignment group, having a positive refractive power and including at least one lens, a lens closest to the object side in the alignment group having a positive refractive power; and a fixing group, having a refractive power and including at least one lens, a lens closest to the image side in the fixing group having a negative refractive power. An edge thickness ETa between the alignment group and the fixing group at positions where radiuses are maximum satisfies: $0.15 \text{ mm} < ETa < 0.5 \text{ mm}$.

According to another aspect, the present disclosure provides a camera lens assembly. The camera lens assembly sequentially includes, from an object side to an image side of the camera lens assembly: an alignment group, having a positive refractive power and including at least one lens, a lens closest to the object side in the alignment group having a positive refractive power; and a fixing group, having a refractive power and including at least one lens, a lens closest to the image side in the fixing group having a negative refractive power. An entrance pupil diameter EPD of the camera lens assembly and an effective focal length f of the camera lens assembly satisfy: $1.6 \leq f/EPD \leq 2.8$.

According to another aspect, the present disclosure provides a camera lens assembly. The camera lens assembly sequentially includes, from an object side to an image side of the camera lens assembly: an alignment group, having a positive refractive power and including at least one lens, a lens closest to the object side an the alignment group having a positive refractive power; and a fixing group, having a refractive power and including at least one lens, a lens closest to the image side in the fixing group having a negative refractive power. An effective focal length f of the camera lens assembly and an axial distance TTL from an object-side surface of a positive lens closest to the object side in the alignment group to an image plane satisfy: $0.8 \leq f/TTL \leq 1.2$.

According to another aspect, the present disclosure provides a camera lens assembly. The camera lens assembly sequentially includes, from an object side to an image side of the camera lens assembly: an alignment group, having a positive refractive power and including at least one lens, a lens closest to the object side in the alignment group having a positive refractive power; and a fixing group, having a refractive power and including at least one lens, a lens closest to the image side in the fixing group having a negative refractive power. An effective focal length f of the camera lens assembly and an effective focal length fb of the fixing group satisfy: $f/|fb| \leq 1.0$.

According to another aspect, the present disclosure provides a camera lens assembly. The camera lens assembly sequentially includes, from an object side to an image side of the camera lens assembly: an alignment group, having a positive refractive power and including at least one lens, a lens closest to the object side in the alignment group having a positive refractive power; and a fixing group, having a refractive power and including at least one lens, a lens closest to the image side in the fixing group having a negative refractive power. An effective focal length f of the camera lens assembly and an effective focal length fbi of a negative lens closest to the image side in the fixing group satisfy: $-2.0 < f/fbi < 0$.

The camera lens assembly of the present disclosure includes an alignment group and a fixing group, realizes the alignment by grouping lenses, thereby improving the module process yield and shortening the AF duration.

BRIEF DESCRIPTION OF THE DRAWINGS

By describing non-limiting embodiments below in detail with reference to the accompanying drawings, other features, objectives and advantages of the present disclosure will be more apparent. In the accompanying drawings:

FIG. 1 is a schematic structural diagram illustrating a camera lens assembly according to Embodiment 1;

FIGS. 2-5 respectively illustrate a longitudinal aberration curve, an astigmatic curve, a distortion curve and a lateral color curve of the camera lens assembly according to Embodiment 1;

FIG. 6 is a schematic structural diagram illustrating a camera lens assembly according to Embodiment 2;

FIGS. 7-10 respectively illustrate a longitudinal aberration curve, an astigmatic curve, a distortion curve and a lateral color curve of the camera lens assembly according to Embodiment 2;

FIG. 11 is a schematic structural diagram illustrating a camera lens assembly according to Embodiment 3;

FIGS. 12-15 respectively illustrate a longitudinal aberration curve, an astigmatic curve, a distortion curve and a lateral color curve of the camera lens assembly according to Embodiment 3;

FIG. 16 is a schematic structural diagram illustrating a camera lens assembly according to Embodiment 4;

FIGS. 17-20 respectively illustrate a longitudinal aberration curve, an astigmatic curve, a distortion curve and a lateral color curve of the camera lens assembly according to Embodiment 4;

DETAILED DESCRIPTION OF EMBODIMENTS

Figure 21:
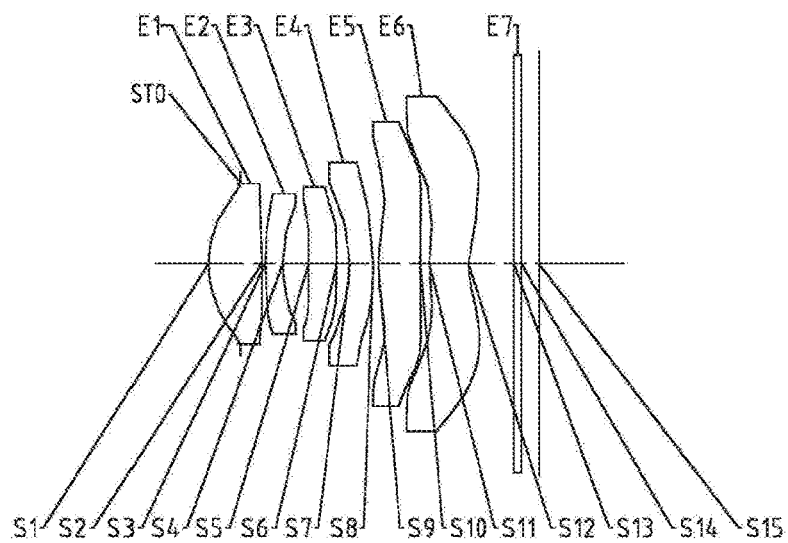
FIG. 21 is a schematic structural diagram illustrating a camera lens assembly according to Embodiment 5.

The present disclosure will be described in more detail below with reference to the accompanying drawings and the embodiments. It may be understood that the specific embodiments described herein are merely illustrative of the present disclosure rather than limitations to the present disclosure. In addition, it should also be noted that, for the convenience of description, only the parts related to the present disclosure are shown in the accompanying drawings.

It should be understood that in the present disclosure, an element or layer may be directly on another element or layer, or directly connected to or coupled to another element or layer, or there may be an intervening element or layer, when the element or layer is described as being "on," "connected to," or "coupled to" another element or layer. When an element is referred to as being "directly on," "directly connected to," or "directly coupled to" another element or layer, there are no intervening elements or layers. Throughout the specification, identical reference numerals refer to the same elements. The expression "and/or" used in this text includes any and all combinations of one or more of the associated listed items.

It should be understood that although the terms $1^{st}$, $2^{nd}$, or first, second, etc. may be used herein to describe various elements, components, areas, layers, and/or sections, these elements, components, areas, layers, and/or sections should not be limited by these terms. These terms are only used to distinguish one element, component, area, layer, or section from another element, component, area, layer, or section. Thus, the first element, component, area, layer, or section discussed below may be termed as the second element, component, area, layer, or section without departing from the teachings of the present disclosure.

The terminology used herein is for the purpose of describing specific embodiments only and is not intended to limit the present disclosure. As used herein, unless explicitly stated otherwise in the context, a term includes singular and plural meanings. It should be further understood that the terms "comprising," "including," "having," and variants thereof, when used in this specification, specify the presence of stated features, entireties, steps, operations, elements and/or components, but do not exclude the presence or addition of one or more other features, entireties, steps, operations, elements, components and/or combinations thereof. As used herein, the term "and/or" includes any and all combinations of one or more of the associated listed items. Expressions, such as "at least one of," when preceding a list of elements, modify the entire list of elements rather than the individual element in the list. Further, the use of "may," when describing the embodiments of the present disclosure, relates to "one or more embodiments of the present disclosure." In addition, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms, such as those defined in commonly used dictionaries, should be interpreted as having a meaning that is consistent with their meaning in the context of the relevant art and will not be interpreted in an idealized or overly formal sense unless expressly so defined herein.

It should be noted that the embodiments in the present disclosure and the features in the embodiments may be combined with each other on a non-conflict basis. The present disclosure will be described below in detail with reference to the accompanying drawings and in combination with the embodiments.

The present disclosure provides a camera lens assembly. The camera lens assembly according to the present disclosure includes, sequentially from an object side to an image side of the camera lens assembly: an alignment group having a positive refractive power and a fixing group having a refractive power. In an embodiment of the present disclosure, the alignment group includes at least one lens, and the lens closest to the object side in the alignment group has a positive refractive power. In an embodiment of the present disclosure, the fixing group includes at least one lens, and the lens closest to the image side in the fixing group has a negative refractive power.

In an embodiment of the present disclosure, an effective focal length fa of the alignment group and an effective focal length f of the camera lens assembly satisfy: $0.6<fa/f<2.0$, and more specifically, satisfy: $0.80 \leq fa/f \leq 1.92$. In the camera lens assembly of the present disclosure, sensitive optical elements adopt the active alignment technology, and the eccentricity compensation principle is applied to adjust the alignment group horizontally and obliquely, thereby reducing the asymmetry of coma and distortion, making the imaging quality uniform and symmetrical and improving the consistency of yield and product quality.

In an embodiment of the present disclosure, an entrance pupil diameter EPD of the camera lens assembly and the effective focal length f of the camera lens assembly satisfy: $1.6 \leq f/EPD \leq 2.8$, and more specifically, satisfy: $1.68 \leq f/EPD \leq 2.67$. The camera lens assembly with a relative aperture in this interval may obtain good shooting effects, and at the same time meet specification effects of the existing electronic products.

In an embodiment of the present disclosure, an edge thickness ETa between the alignment group and the fixing group at positions where the radiuses are maximum satisfies: $0.15 \text{ mm} < ETa < 0.5 \text{ mm}$, and more specifically, satisfy: $0.19 \leq ETa \leq 0.34$. The camera lens assembly satisfying the above relationship can ensure the alignment space and the processability of the assembly process.

In an embodiment of the present disclosure, the effective focal length f of the camera lens assembly and an axial distance TTL from an object-side surface of a positive lens closest to the object side in the alignment group to an image plane satisfy: $0.8 \leq f/TTL \leq 1.2$, and more specifically, satisfy: $0.82 \leq f/TTL \leq 1.12$. By satisfying the above relationship, the miniaturization of the lens assembly can be ensured while having good imaging effects and processing characteristics.

In an embodiment of the present disclosure, the effective focal length f of the camera lens assembly and an effective focal length fb of the fixing group satisfy: $f/|fb| \leq 1.0$, and more specifically, satisfy: $f/|fb| \leq 0.99$. In the camera lens assembly satisfying the above relationship, the sensitivity of the fixing group is reduced by setting the refractive power, and the alignment precision is only associated with the alignment group, which facilitates the assembly and the alignment.

In an embodiment of the present disclosure, the effective focal length f of the camera lens assembly and an effective focal length fbi of a negative lens closest to the image side in the fixing group satisfy: $-2.0<f/fbi<0$, and more specifically, satisfy: $-1.625 \leq f/fbi \leq -0.20$. By satisfying the above relationship, aberrations such as astigmatism and distortion of the imaging system can be effectively corrected, and it is advantageous to match the chief ray angle of the chip.

In an embodiment of the present disclosure, a dispersion coefficient V1 of the positive lens closest to the object side in the alignment group and a dispersion coefficient V2 of a negative lens adjacent to the positive lens satisfy: $0.5<V1/(V1+V2)<1$, and more specifically, satisfy: $0.70 \leq V1/(V1+V2) \leq 0.80$. In the camera lens assembly satisfying the above relationship, a chromatic aberration of the lens assembly is corrected by mutual cooperation between different materials.

The present disclosure is further described in detail below in combination with the specific embodiments.

Embodiment 1

First, a camera lens assembly according to Embodiment 1 of the present disclosure is described with reference to FIGS. 1 to 5.

FIG. 1 is a schematic structural diagram illustrating the camera lens assembly according to Embodiment 1. As shown in FIG. 1, the camera lens assembly includes five lenses. The five lenses are respectively a first lens E1 having an object-side surface S1 and an image-side surface S2, a second lens E2 having an object-side surface S3 and an image-side surface S4, a third lens E3 having an object-side surface S5 and an image-side surface S6, a fourth lens E4 having an object-side surface S7 and an image-side surface S8, and a fifth lens E5 having an object-side surface S9 and an image-side surface S10. The first to fifth lenses E1 to E5 are sequentially arranged from an object side to an image side of the camera lens assembly. The alignment group includes the first lens and the second lens, and the fixing group includes the third lens, the fourth lens, and the fifth lens. The alignment group is adjustable in a direction perpendicular to the optical axis.

The first lens E1 may have a positive refractive power, the object-side surface S1 of the first lens E1 may be a convex surface, and the image-side surface S2 of the first lens E1 is a concave surface.

The second lens E2 may have a negative refractive power, the object-side surface S3 of the second lens E2 may be a convex surface, and the image-side surface S4 of the second lens E2 may be a concave surface.

The third lens E3 may have a negative refractive power, the object-side surface S5 of the third lens E3 may be a convex surface, and the image-side surface S6 of the third lens E3 may be a concave surface.

The fourth lens E4 may have a negative refractive power, the object-side surface S7 of the fourth lens E4 may be a convex surface, and the image-side surface S8 of the fourth lens E4 may be a concave surface.

The fifth lens E5 may have a negative refractive power, the object-side surface S9 of the fifth lens E5 may be a concave surface, and the image-side surface S10 of the fifth lens E5 may be a convex surface.

The camera lens assembly further includes an optical filter E6 having an object-side surface S11 and an image-side surface S12 for filtering infrared light. In the present embodiment, light from an object passes through the surfaces S1 to S12 sequentially and finally forms an image on the image plane S13.

In the present embodiment, the first to fifth lenses E1 to E5 have respective effective focal lengths f1 to f5. The first lens E1 to the fifth lens E5 are sequentially arranged along the optical axis and collectively determines the total effective focal length f of the camera lens assembly. Table 1 below shows the effective focal lengths f1 to f5 of the first to fifth lenses E1 to E5, the total effective focal length f of the camera lens assembly, the total track length TTL (mm) of the camera lens assembly, and the half of the maximal field-of-view HFOV of the camera lens assembly.

TABLE 1

| f1(mm) | 2.80   | f(mm)   | 5.97 |
|--------|--------|---------|------|
| f2(mm) | −4.30  | TTL(mm) | 5.33 |
| f3(mm) | −93.19 | HFOV(°) | 25.0 |
| f4(mm) | −8.25  |         |      |
| f5(mm) | −29.33 |         |      |

Table 2 shows the surface type, the radius of curvature, the thickness, the material and the conic coefficient of each lens of the camera lens assembly in the present embodiment. The units of the radius of curvature and the thickness are millimeters (mm).

TABLE 2

| surface number | surface type | radius of curvature | thick- ness | material refrac- tive index | abbe num- ber | conic coeffi- cient |
|---|---|---|---|---|---|---|
| OBJ | spherical | infinite | infinite | | | |
| STO | spherical | infinite | −0.5198 | | | |
| S1 | aspheric | 1.4187 | 0.7662 | 1.55 | 56.1 | −3.1371 |
| S2 | aspheric | 16.0388 | 0.2424 | | | 68.9426 |
| S3 | aspheric | 9.6382 | 0.3090 | 1.67 | 20.4 | 86.8209 |
| S4 | aspheric | 2.1846 | 0.4919 | | | 4.8473 |
| S5 | aspheric | 23.9954 | 0.3400 | 1.55 | 56.1 | −78.2566 |

TABLE 2-continued

| surface number | surface type | radius of curvature | thick- ness | material refrac- tive index | abbe num- ber | conic coeffi- cient |
|---|---|---|---|---|---|---|
| S6 | aspheric | 16.2292 | 1.0172 | | | 46.4141 |
| S7 | aspheric | 37.3626 | 0.3150 | 1.55 | 56.1 | 29.7752 |
| S8 | aspheric | 4.0112 | 0.2112 | | | −7.3607 |
| S9 | aspheric | −10.2820 | 0.8158 | 1.65 | 23.5 | 9.5781 |
| S10 | aspheric | −23.2262 | 0.0509 | | | 40.0185 |
| S11 | spherical | infinite | 0.2100 | 1.52 | 64.2 | |
| S12 | spherical | infinite | 0.5605 | | | |
| S13 | spherical | infinite | | | | |

In the present embodiment, the aspheric lens may be used for each lens, and the surface type of each aspheric surface is defined by the following formula:

$$x = \frac{ch^2}{1 + \sqrt{1 - (k+1)c^2h^2}} + \sum A_i h^i \quad (1)$$

Here, x is the sag to the aspheric vertex, when the aspheric surface is at height h from the optical axis; c is the paraxial curvature of the aspheric surface, and c=1/R (i.e., the paraxial curvature c is the reciprocal of the radius of curvature R in Table 1 above); k is the conic coefficient (given in Table 2 above); and $A_i$ is the correction coefficient of the $i^{th}$ order of the aspheric surface.

Table 3 below shows the high-order coefficients $A_4$, $A_6$, $A_8$, $A_{10}$, $A_{12}$ and $A_{14}$ applicable to the aspheric surfaces S1-S10 of the aspheric lenses in the present embodiment.

TABLE 3

| surface number | A4 | A6 | A8 | A10 | A12 | A14 |
|---|---|---|---|---|---|---|
| S1  | 1.3601E−01  | −6.3720E−02 | 1.0169E−01  | −1.2051E−01 | 8.2581E−02  | −2.2878E−02 |
| S2  | −2.8388E−02 | 5.4797E−02  | −6.2690E−02 | 5.0573E−02  | −2.0410E−02 | 2.6880E−04  |
| S3  | −1.0467E−01 | 2.1443E−01  | −1.4238E−01 | −1.9355E−02 | 1.0904E−01  | −6.9507E−02 |
| S4  | −1.1540E−01 | 8.6389E−02  | 7.5010E−01  | −2.4571E+00 | 3.5006E+00  | −1.8879E+00 |
| S5  | −1.5772E−01 | 1.0910E−01  | 3.0736E−02  | 1.3085E−02  | −1.6124E−02 | 0.0000E+00  |
| S6  | −9.7256E−02 | 9.9548E−02  | 8.2801E−03  | 1.1860E−02  | −1.7289E−02 | 0.0000E+00  |
| S7  | −1.5951E−01 | −3.7932E−02 | 4.9498E−02  | −1.8220E−02 | 6.8606E−03  | −1.2788E−03 |
| S8  | −5.2000E−02 | −3.9011E−02 | 3.8016E−02  | −1.6851E−02 | 3.5869E−03  | −2.8651E−04 |
| S9  | 3.1443E−02  | −8.3641E−03 | 7.2344E−704 | −7.5065E−05 | 5.3379E−05  | −6.9098E−06 |
| S10 | −5.5759E−02 | −9.6986E−04 | 1.0286E−02  | −3.5946E−03 | 5.2707E−04  | −2.9377E−05 |

FIG. 2 shows the longitudinal aberration curve of the camera lens assembly according to Embodiment 1, representing deviations of focal points where lights of different wavelengths converge after passing through the optical system. FIG. 3 shows the astigmatic curve of the camera lens assembly according to Embodiment 1, representing a curvature of the tangential image plane and a curvature of the sagittal image plane. FIG. 4 shows the distortion curve of the camera lens assembly according to Embodiment 1, representing degrees of distortion at different viewing angles. FIG. 5 shows the lateral color curve of the camera lens assembly according to Embodiment 1, representing deviations of different heights of images on the image plane formed by light passing through the camera lens assembly. In summary, with reference to FIGS. 2 to 5, the camera lens assembly according to Embodiment 1 can realize the alignment function by grouping the lenses, thereby improving the module process yield and shortening the AF duration.

Embodiment 2

A camera lens assembly according to Embodiment 2 of the present disclosure is described with reference to FIGS. 6 to 10.

FIG. 6 is a schematic structural diagram illustrating the camera lens assembly according to Embodiment 2. As shown in FIG. 6, the camera lens assembly includes six lenses. The six lenses are respectively a first lens E1 having an object-side surface S1 and an image-side surface S2, a second lens E2 having an object-side surface S3 and an image-side surface S4, a third lens E3 having an object-side surface S5 and an image-side surface S6, a fourth lens E4 having an object-side surface S7 and an image-side surface S8, a fifth lens E5 having an object-side surface S9 and an image-side surface S10 and a sixth lens E6 having an object-side surface S11 and an image-side surface S12. The first to sixth lenses E1 to E6 are sequentially arranged from an object side to an image side of the camera lens assembly. The alignment group includes the first lens, the second lens and the third lens, and the fixing group includes the fourth lens, the fifth lens and the sixth lens. The alignment group is adjustable in a direction perpendicular to the optical axis.

The first lens E1 may have a positive refractive power, the object-side surface S1 of the first lens E1 may be a convex surface, and the image-side surface S2 of the first lens E1 is a concave surface.

The second lens E2 may have a negative refractive power, the object-side surface S3 of the second lens E2 may be a convex surface, and the image-side surface S4 of the second lens E2 may be a concave surface.

The third lens E3 may have a positive refractive power, the object-side surface S5 of the third lens E3 may be a convex surface, and the image-side surface S6 of the third lens E3 may be a concave surface.

The fourth lens E4 may have a positive refractive power, the object-side surface S7 of the fourth lens E4 may be a convex surface, and the image-side surface S8 of the fourth lens E4 may be a convex surface.

The fifth lens E5 may have a positive refractive power, the object-side surface S9 of the fifth lens E5 may be a convex surface, and the image-side surface S10 of the fifth lens E5 may be a convex surface.

The sixth lens E6 may have a negative refractive power, the object-side surface S11 of the sixth lens E6 may be a convex surface, and the image-side surface S12 of the sixth lens E6 may be a concave surface.

The camera lens assembly further includes an optical filter E7 having an object-side surface S13 and an image-side surface S14 for filtering infrared light. In the present embodiment, light from an object passes through the surfaces S1 to S14 sequentially and finally forms an image on the image plane S15.

Table 4 below shows the effective focal lengths f1 to f6 of the first to sixth lenses E1 to E6, the total effective focal length f of the camera lens assembly, the total track length TTL of the camera lens assembly, and the half of the maximal field-of-view HFOV of the camera lens assembly.

TABLE 4

| f1(mm) | 5.35 | f(mm) | 3.86 |
| f2(mm) | −5.63 | TTL(min) | 4.73 |
| f3(mm) | 4.14 | HFOV(°) | 38.1 |
| f4(mm) | 37.49 | | |
| f5(mm) | 35.28 | | |
| f6(mm) | −7.86 | | |

Table 5 shows the surface type, the radius of curvature, the thickness, the material and the conic coefficient of each lens of the camera lens assembly in the present embodiment. The units of the radius of curvature and the thickness are millimeters (mm).

TABLE 5

| surface number | surface type | radius of curvature | thickness | refractive index | abbe number | conic coefficient |
|---|---|---|---|---|---|---|
| OBJ | spherical | infinite | infinite | | | |
| STO | spherical | infinite | −0.3616 | | | |
| S1 | aspheric | 1.7914 | 0.5434 | 1.55 | 56.1 | −2.7211 |
| S2 | aspheric | 4.1278 | 0.1120 | | | −9.8886 |
| S3 | aspheric | 3.3699 | 0.2500 | 1.67 | 20.4 | −22.8148 |
| S4 | aspheric | 1.7239 | 0.1085 | | | −2.9482 |
| S5 | aspheric | 2.0630 | 0.5523 | 1.69 | 53.1 | −2.1989 |
| S6 | aspheric | 6.4608 | 0.4703 | | | −4.1740 |
| S7 | aspheric | 40.3227 | 0.4300 | 1.54 | 55.9 | −90.0000 |
| S8 | aspheric | −40.0847 | 0.2972 | | | −90.0000 |
| S9 | aspheric | 25.4455 | 0.4742 | 1.65 | 23.5 | −90.0000 |
| S10 | aspheric | −213.5136 | 0.0794 | | | 0.0000 |
| S11 | aspheric | 1.5878 | 0.3944 | 1.54 | 55.9 | −11.6741 |
| S12 | aspheric | 1.0536 | 0.4293 | | | −5.6687 |
| S13 | spherical | infinite | 0.1100 | 1.52 | 64.2 | |
| S14 | spherical | infinite | 0.4789 | | | |
| S15 | spherical | infinite | | | | |

Table 6 below shows the high-order coefficients applicable to the aspheric surfaces S1-S12 of the aspheric lenses in the present embodiment. The surface type of each aspheric surface may be defined by the formula (1) given in the above Embodiment 1.

TABLE 6

| surface number | A4 | A6 | A8 | A10 | A12 | A14 | A16 | A18 |
|---|---|---|---|---|---|---|---|---|
| S1 | 5.2492E−02 | −1.2457E−02 | −1.5906E−02 | 2.2080E−02 | −1.5444E−02 | 3.9656E−03 | 0 | 0 |
| S2 | 6.3723E−02 | −1.1938E−01 | 4.9828E−02 | −5.2879E−02 | 0 | 0 | 0 | 0 |
| S3 | 8.9540E−02 | −1.3532E−01 | 5.7536E−02 | −7.8798E−03 | 0 | 0 | 0 | 0 |
| S4 | −2.2551E−02 | 6.5627E−02 | −7.2699E−02 | 1.5843E−02 | 0 | 0 | 0 | 0 |
| S5 | −4.2948E−02 | 7.0695E−02 | −4.3444E−02 | 9.3904E−03 | −2.5085E−04 | 0 | 0 | 0 |
| S6 | −3.3133E−02 | 0 | 0 | 0 | 0 | 0 | 0 | 0 |
| S7 | −2.3602E−02 | −2.9792E−01 | 8.4447E−02 | −1.5284E+00 | 1.5445E+00 | −8.1485E−01 | 1.6611E−01 | 0 |
| S8 | 7.0442E−02 | −5.4923E−01 | 1.1314E+00 | −1.4322E+00 | 1.1189E+00 | −5.0665E−01 | 1.2075E−01 | −1.1685E−02 |

TABLE 6-continued

| surface number | A4 | A6 | A8 | A10 | A12 | A14 | A16 | A18 |
|---|---|---|---|---|---|---|---|---|
| S9  | 2.7958E−01  | −7.2784E−01 | 8.9374E−01  | −7.3818E−01 | 3.7390E−01  | −1.0869E−01 | 1.6645E−02  | −1.0420E−03 |
| S10 | 2.3910E−01  | −4.9748E−01 | 4.9221E−01  | −3.2548E−01 | 1.3889E−01  | −3.5922E−02 | 5.0859E−03  | −3.0039E−04 |
| S11 | −2.3643E−01 | −1.7778E−02 | 1.1378E−01  | −6.7598E−02 | 2.0936E−02  | −3.8209E−03 | 3.8939E−04  | −1.7076E−05 |
| S12 | −2.1661E−01 | 1.3420E−01  | −7.3783E−02 | 3.4369E−02  | −1.1083E−02 | 2.1636E−03  | −2.2761E−04 | 9.8825E−06  |

FIG. 7 shows the longitudinal aberration curve of the camera lens assembly according to Embodiment 2, representing deviations of focal points where lights of different wavelengths converge after passing through the optical system. FIG. 8 shows the astigmatic curve of the camera lens assembly according to Embodiment 2, representing a curvature of the tangential image plane and a curvature of the sagittal image plane. FIG. 9 shows the distortion curve of the camera lens assembly according to Embodiment 2, representing degrees of distortion at different viewing angles. FIG. 10 shows the lateral color curve of the camera lens assembly according to Embodiment 2, representing deviations of different heights of images on the image plane formed by light passing through the camera lens assembly. In summary, with reference to FIGS. 7 to 10, the camera lens assembly according to Embodiment 2 can realize the alignment function by grouping the lenses, thereby improving the module process yield and shortening the AF duration.

Embodiment 3

A camera lens assembly according to Embodiment 3 of the present disclosure is described with reference to FIGS. 11 to 15.

FIG. 11 is a schematic structural diagram illustrating the camera lens assembly according to Embodiment 3. The camera lens assembly sequentially includes, from an object side to an image side, a first lens E1, a second lens E2, a third lens E3, a fourth lens E4, a fifth lens E5, and a sixth lens E6. The alignment group includes the first lens, the second lens and the third lens, and the fixing group includes the fourth lens, the fifth lens and the sixth lens. The alignment group is adjustable in a direction perpendicular to the optical axis.

The first lens E1 may have a positive refractive power, the object-side surface S1 of the first lens E1 may be a convex surface, and the image-side surface S2 of the first lens E1 is a concave surface.

The second lens E2 may have a negative refractive power, the object-side surface S3 of the second lens E2 may be a convex surface, and the image-side surface S4 of the second lens E2 may be a concave surface.

The third lens E3 may have a positive refractive power, the object-side surface S5 of the third lens E3 may be a convex surface, and the image-side surface S6 of the third lens E3 may be a concave surface.

The fourth lens E4 may have a positive refractive power, the object-side surface S7 of the fourth lens E4 may be a convex surface, and the image-side surface S8 of the fourth lens E4 may be a concave surface.

The fifth lens E5 may have a positive refractive power, the object-side surface S9 of the fifth lens E5 may be a convex surface, and the image-side surface S10 of the fifth lens E5 may be a convex surface.

The sixth lens E6 may have a negative refractive power, the object-side surface S11 of the sixth lens E6 may be a convex surface, and the image-side surface S12 of the sixth lens E6 may be a concave surface.

Table 7 below shows the effective focal lengths f1 to f6 of the first to sixth lenses E1 to E6, the total effective focal length f of the camera lens assembly, the total track length TTL of the camera lens assembly, and the half of the maximal field-of-view HFOV of the camera lens assembly.

TABLE 7

| f1(mm) | 4.38   | f(mm)   | 4.27 |
|---|---|---|---|
| f2(mm) | −8.07  | TTL(mm) | 4.94 |
| f3(mm) | 9.23   | HFOV(°) | 38.8 |
| f4(mm) | 260.62 |         |      |
| f5(mm) | 3.99   |         |      |
| f6(mm) | −2.63  |         |      |

Table 8 shows the surface type, the radius of curvature, the thickness, the material and the conic coefficient of each lens of the camera lens assembly in the present embodiment. The units of the radius of curvature and the thickness are millimeters (mm).

TABLE 8

| | | | | material | | |
|---|---|---|---|---|---|---|
| surface number | surface type | radius of curvature | thickness | refractive index | abbe number | conic coefficient |
| OBJ | spherical | infinite  | infinite |      |      |          |
| STO | spherical | infinite  | −0.4365  |      |      |          |
| S1  | aspheric  | 1.6810    | 0.6002   | 1.55 | 56.1 | −6.5072  |
| S2  | aspheric  | 4.9449    | 0.0556   |      |      | −3.7932  |
| S3  | aspheric  | 3.6812    | 0.2315   | 1.67 | 20.4 | −26.7382 |
| S4  | aspheric  | 2.1293    | 0.2719   |      |      | −1.9460  |
| S5  | aspheric  | 2.9776    | 0.4415   | 1.55 | 56.1 | −4.6166  |
| S6  | aspheric  | 6.8956    | 0.4692   |      |      | −25.5915 |
| S7  | aspheric  | 4.8124    | 0.3199   | 1.65 | 23.5 | −6.1798  |
| S8  | aspheric  | 4.8256    | 0.4123   |      |      | −3.7940  |
| S9  | aspheric  | 15.0339   | 0.5603   | 1.55 | 56.1 | −6.0251  |
| S10 | aspheric  | −2.5131   | 0.1417   |      |      | −37.6568 |
| S11 | aspheric  | 6.8166    | 0.3400   | 1.55 | 56.1 | −17.5812 |
| S12 | aspheric  | 1.1638    | 0.2800   |      |      | −7.9805  |
| S13 | spherical | infinite  | 0.3000   | 1.52 | 64.2 |          |
| S14 | spherical | infinite  | 0.5159   |      |      |          |
| S15 | spherical | infinite  |          |      |      |          |

Table 9 below shows the high-order coefficients applicable to the aspheric surfaces S1-S12 of the aspheric lenses in the present embodiment. The surface type of each aspheric surface may be defined by the formula (1) given in the above Embodiment 1.

TABLE 9

| surface number | A4 | A6 | A8 | A10 | A12 | A14 | A16 |
|---|---|---|---|---|---|---|---|
| S1 | 1.6674E−01 | −1.2623E−01 | 1.1239E−01 | −7.4304E−02 | 2.4756E−02 | −4.3875E−03 | 0.0000E+00 |
| S2 | −1.1231E−01 | 3.4865E−01 | −5.4467E−01 | 4.0256E−01 | −1.3923E−01 | 1.6536E−02 | 0.0000E+00 |
| S3 | −1.2057E−01 | 4.7211E−01 | −7.2018E−01 | 5.4865E−01 | −1.8246E−01 | 1.7960E−02 | 0.0000E+00 |
| S4 | −1.0455E−01 | 3.3374E−01 | −4.2209E−01 | 2.8605E−01 | −4.8012E−02 | −1.3475E−02 | 0.0000E+00 |
| S3 | −6.3509E−02 | 1.2326E−01 | −2.9361E−01 | 4.7166E−01 | −4.8449E−01 | 2.6672E−01 | −5.6652E−02 |
| S6 | −6.1194E−02 | 9.0228E−03 | 3.0786E−02 | −1.5103E−01 | 1.8847E−01 | −1.1457E−01 | 2.8614E−02 |
| S7 | −1.0606E−01 | −4.3039E−02 | 1.6347E−01 | −2.7408E−01 | 2.2312E−01 | −9.9179E−02 | 1.8218E−02 |
| S8 | −1.0445E−01 | −2.1761E−02 | 6.1116E−02 | −5.8208E−02 | 2.4121E−02 | −2.7686E−03 | −1.7891E−04 |
| S9 | 6.8180E−02 | −1.3031E−01 | 6.7749E−02 | −2.3618E−02 | −6.7419E−03 | 6.9713E−03 | −1.1757E−03 |
| S10 | 4.3280E−02 | 3.9926E−03 | −3.1502E−02 | 1.4719E−02 | −2.9195E−03 | 2.7185E−04 | −9.7852E−06 |
| S11 | −3.1655E−01 | 2.1549E−01 | −8.2396E−02 | 2.0089E−02 | −3.0747E−03 | 2.6893E−04 | −1.0240E−05 |
| S12 | −1.5592E−01 | 9.1748E−02 | −3.8073E−02 | 9.8261E−03 | −1.4911E−03 | 1.2135E−04 | −4.0600E−06 |

FIG. 12 shows the longitudinal aberration curve of the camera lens assembly according to Embodiment 3, representing deviations of focal points where lights of different wavelengths converge after passing through the optical system. FIG. 13 shows the astigmatic curve of the camera lens assembly according to Embodiment 3, representing a curvature of the tangential image plane and a curvature of the sagittal image plane. FIG. 14 shows the distortion curve of the camera lens assembly according to Embodiment 3, representing degrees of distortion at different viewing angles. FIG. 15 shows the lateral color curve of the camera lens assembly according to Embodiment 3, representing deviations of different heights of images on the image plane formed by light passing through the camera lens assembly. In summary, with reference to FIGS. 12 to 15, the camera lens assembly according to Embodiment 3 can realize the alignment function by grouping the lenses, thereby improving the module process yield and shortening the AF duration.

Embodiment 4

A camera lens assembly according to Embodiment 4 of the present disclosure is described with reference to FIGS. 16 to 20.

FIG. 16 is a schematic structural diagram illustrating the camera lens assembly according to Embodiment 4. The camera lens assembly sequentially includes, from an object side to an image side, a first lens E1, a second lens E2, a third lens E3, a fourth lens E4, a fifth lens E5, and a sixth lens E6. The alignment group includes the first lens and the second lens, and the fixing group includes the third lens, the fourth lens, the fifth lens and the sixth lens. The alignment group is adjustable in a direction perpendicular to the optical axis.

The first lens E1 may have a positive refractive power, the object-side surface S1 of the first lens E1 may be a convex surface, and the image-side surface S2 of the first lens E1 is a concave surface.

The second lens E2 may have a negative refractive power, the object-side surface S3 of the second lens E2 may be a convex surface, and the image-side surface S4 of the second lens E2 may be a concave surface.

The third lens E3 may have a positive refractive power, the object-side surface S5 of the third lens E3 may be a convex surface, and the image-side surface S6 of the third lens E3 may be a convex surface.

The fourth lens E4 may have a negative refractive power, the object-side surface S7 of the fourth lens E4 may be a concave surface, and the image-side surface S8 of the fourth lens E4 may be a convex surface.

The fifth lens E5 may have a positive refractive power, the object-side surface S9 of the fifth lens E5 may be a convex surface, and the image-side surface S10 of the fifth lens E5 may be a concave surface.

The sixth lens E6 may have a negative refractive power, the object-side surface S11 of the sixth lens E6 may be a convex surface, and the image-side surface S12 of the sixth lens E6 may be a concave surface.

Table 10 below shows the effective focal lengths f1 to f6 of the first to sixth lenses E1 to E6, the total effective focal length f of the camera lens assembly, the total track length TTL of the camera lens assembly, and the half of the maximal field-of-view HFOV of the camera lens assembly.

TABLE 10

| f1(mm) | 4.15 | f(mm) | 4.51 |
|---|---|---|---|
| f2(mm) | −15.76 | TTL(mm) | 5.27 |
| f3(mm) | 13.55 | HFOV(°) | 42.2 |
| f4(mm) | −10.29 | | |
| f5(mm) | 6.31 | | |
| f6(mm) | −5.13 | | |

Table 11 below shows the surface type, the radius of curvature, the thickness, the material and the conic coefficient of each lens of the camera lens assembly in the present embodiment. The units of radius of curvature and the thickness are millimeters (mm).

TABLE 11

| | | | | material | | |
|---|---|---|---|---|---|---|
| surface number | surface type | radius of curvature | thickness | refractive index | abbe number | conic coefficient |
| OBJ | spherical | infinite | infinite | | | |
| STO | spherical | infinite | −0.3520 | | | |
| S1 | aspheric | 1.7069 | 0.6621 | 1.55 | 56.1 | −1.5057 |
| S2 | aspheric | 5.9584 | 0.0464 | | | −10.0347 |
| S3 | aspheric | 6.4618 | 0.2378 | 1.65 | 23.5 | −10.0240 |
| S4 | aspheric | 3.8904 | 0.4277 | | | −1.0000 |
| S5 | aspheric | 32.3670 | 0.3799 | 1.55 | 56.1 | −10.0275 |
| S6 | aspheric | −9.5473 | 0.3498 | | | −10.0287 |
| S7 | aspheric | −1.3875 | 0.3625 | 1.65 | 23.5 | −5.6796 |
| S8 | aspheric | −1.9348 | 0.0524 | | | −7.4813 |
| S9 | aspheric | 3.1571 | 0.5000 | 1.55 | 56.1 | −33.2830 |
| S10 | aspheric | 35.3741 | 0.7153 | | | −10.0312 |
| S11 | aspheric | 5.6136 | 0.4023 | 1.55 | 56.1 | −3.1763 |
| S12 | aspheric | 1.8202 | 0.5954 | | | −2.6068 |
| S13 | spherical | infinite | 0.2100 | 1.52 | 64.2 | |
| S14 | spherical | infinite | 0.3284 | | | |
| S15 | spherical | infinite | | | | |

Table 12 below shows the high-order coefficients applicable to the aspheric surfaces S1-S12 of the aspheric lenses in the present embodiment. The surface type of each aspheric surface may be defined by the formula (1) given in the above Embodiment 1.

TABLE 12

| surface number | A4 | A6 | A8 | A10 | A12 | A14 | A16 |
|---|---|---|---|---|---|---|---|
| S1 | 3.1794E−02 | 3.8430E−02 | −1.1667E−01 | 1.9111E−01 | −1.8120E−01 | 8.8366E−02 | −2.0393E−02 |
| S2 | −1.3244E−01 | −1.3141E−01 | 8.4616E−01 | −1.4606E+00 | 1.2455E+00 | −5.4402E−01 | 9.5591E−02 |
| S3 | −1.5457E−01 | −1.0409E−01 | 1.0589E+00 | −1.9127E+00 | 1.6802E+00 | −7.2659E−01 | 1.2100E−01 |
| S4 | −4.3233E−02 | 5.7574E−02 | 7.0280E−02 | 1.5539E−01 | −6.6806E−01 | 7.4842E−01 | −2.7071E−01 |
| S5 | −6.6965E−02 | −6.4048E−03 | −2.5863E−01 | 7.6460E−01 | −1.0981E+00 | 8.0744E−01 | −2.2350E−01 |
| S6 | −5.8360E−02 | 1.2433E−01 | −5.3344E−01 | 8.0871E−01 | −6.7580E−01 | 3.2202E−01 | −6.2472E−02 |
| S7 | −1.2268E−01 | 4.5063E−01 | −9.7645E−01 | 1.0160E+00 | −5.3035E−01 | 1.3711E−01 | −1.5051E−02 |
| S8 | −1.0180E−01 | 2.2883E−01 | −4.0220E−01 | 3.7282E−01 | −1.7368E−01 | 3.9575E−02 | −3.5454E−03 |
| S9 | 9.4397E−02 | −1.8040E−01 | 1.0599E−01 | −3.3285E−02 | 3.7876E−03 | 4.0503E−04 | −8.9297E−05 |
| S10 | 9.7271E−02 | −1.5293E−01 | 8.8329E−02 | −3.1456E−02 | 6.6922E−03 | −7.7307E−04 | 3.7673E−05 |
| S11 | −1.1928E−01 | −1.1183E−02 | 1.5941E−02 | −3.7453E−03 | 4.1491E−04 | −2.2877E−05 | 5.0628E−07 |
| S12 | −1.3550E−01 | 4.2917E−02 | −1.1355E−02 | 2.2629E−03 | −2.8786E−04 | 1.9679E−05 | −5.3412E−07 |

FIG. 17 shows the longitudinal aberration curve of the camera lens assembly according to Embodiment 4, representing deviations of focal points where lights of different wavelengths converge after passing through the optical system. FIG. 18 shows the astigmatic curve of the camera lens assembly according to Embodiment 4, representing a curvature of the tangential image plane and a curvature of the sagittal image plane. FIG. 19 shows the distortion curve of the camera lens assembly according to Embodiment 4, representing degrees of distortion at different viewing angles. FIG. 20 shows the lateral color curve of the camera lens assembly according to Embodiment 4, representing deviations of different heights of images on the image plane formed by light passing through the camera lens assembly. In summary, with reference to FIGS. 17 to 20, the camera lens assembly according to Embodiment 4 can realise the alignment function by grouping the lenses, thereby improving the module process yield and shortening the AF duration.

Embodiment 5

A camera lens assembly according to Embodiment 5 of the present disclosure is described with reference to FIGS. 21 to 25.

FIG. 21 is a schematic structural diagram illustrating the camera lens assembly according to Embodiment 5. The camera lens assembly sequentially includes, from an object side to an image side, a first lens E1, a second lens E2, a third lens E3, a fourth lens E4, a fifth lens E5, and a sixth lens E6. The alignment group includes the first lens, the second lens, the third lens and the fourth lens, and the fixing group includes the fifth lens and the sixth lens. The alignment group is adjustable in a direction perpendicular to the optical axis.

The first lens E1 may have a positive refractive power, the object-side surface S1 of the first lens E1 may be a convex surface, and the image-side surface S2 of the first lens E1 is a concave surface.

The second lens E2 may have a negative refractive power, the object-side surface S3 of the second lens E2 may be a convex surface, and the image-side surface S4 of the second lens E2 may be a concave surface.

The third lens E3 may have a positive refractive power, the object-side surface S5 of the third lens E3 may be a convex surface, and the image-side surface S6 of the third lens E3 may be a convex surface.

The fourth lens E4 may have a negative refractive power, the object-side surface S7 of the fourth lens E4 may be a concave surface, and the image-side surface S$ of the fourth lens E4 may be a convex surface.

The fifth lens E5 may have a positive refractive power, the object-side surface S9 of the fifth lens E5 may be a convex surface, and the image-side surface S10 of the fifth lens E5 may be a convex surface.

The sixth lens E6 may have a negative refractive power, the object-side surface S11 of the sixth lens E6 may be a convex surface, and the image-side surface S12 of the sixth lens E6 may be a concave surface.

Table 13 below shows the effective focal lengths f1 to f6 of the first to sixth lenses E1 to E6, the total effective focal length f of the camera lens assembly, the total track length TTL of the camera lens assembly, and the half of the maximal field-of-view HFOV of the camera lens assembly.

TABLE 13

| f1(mm) | 2.85 | f(mm) | 3.89 |
|---|---|---|---|
| f2(mm) | −5.59 | TTL(mm) | 4.74 |
| f3(mm) | 12.48 | HFOV(°) | 37.5 |
| f4(mm) | −3.93 | | |
| f5(mm) | 4.05 | | |
| f6(mm) | −9.75 | | |

Table 14 below shows the surface type, the radius of curvature, the thickness, the material and the conic coefficient of each lens of the camera lens assembly in the present embodiment. The units of radius of curvature and the thickness are millimeters (mm).

TABLE 14

| | | | | material | | |
|---|---|---|---|---|---|---|
| surface number | surface type | radius of curvature | thickness | refractive index | abbe number | conic coefficient |
| OBJ | spherical | infinite | infinite | | | |
| STO | spherical | infinite | −0.4604 | | | |
| S1 | aspheric | 1.5356 | 0.7668 | 1.55 | 56.1 | −0.1537 |
| S2 | aspheric | 98.6466 | 0.0514 | | | 63.0000 |
| S3 | aspheric | 5.3478 | 0.2500 | 1.67 | 20.4 | −46.0784 |
| S4 | aspheric | 2.1524 | 0.3725 | | | 3.8860 |
| S5 | aspheric | 14.4638 | 0.4038 | 1.52 | 63.5 | −23.3540 |
| S6 | aspheric | −11.6239 | 0.1876 | | | 42.3839 |
| S7 | aspheric | −2.2134 | 0.3362 | 1.65 | 23.5 | −0.8015 |
| S8 | aspheric | −18.9532 | 0.0739 | | | 63.0000 |
| S9 | aspheric | 2.6539 | 0.5942 | 1.65 | 23.5 | −10.3402 |
| S10 | aspheric | −128.1819 | 0.1282 | | | 63.0000 |
| S11 | aspheric | 2.1082 | 0.5646 | 1.54 | 55.9 | −4.1924 |
| S12 | aspheric | 1.3621 | 0.6503 | | | −1.3297 |
| S13 | spherical | infinite | 0.1100 | 1.52 | 64.2 | |
| S14 | spherical | infinite | 0.2485 | | | |
| S15 | spherical | infinite | | | | |

Table 15 below shows the high-order coefficients applicable to the aspheric surfaces S1-S12 of the aspheric lenses in the present embodiment. The surface type of each aspheric surface may be defined by the formula (1) given in the above Embodiment 1.

TABLE 15

| surface number | A4 | A6 | A8 | A10 | A12 | A14 | A16 | A18 |
|---|---|---|---|---|---|---|---|---|
| S1 | −2.6734E−03 | 2.8788E−02 | −7.2274E−02 | 8.5703E−02 | −5.7152E−02 | 1.6650E−02 | −3.5232E−03 | 0 |
| S2 | −8.4725E−02 | 3.3439E−01 | −7.3929E−01 | 9.9071E−01 | −8.2584E−01 | 3.7933E−01 | −7.3320E−02 | 0 |
| S3 | −1.1471E−01 | 4.8883E−01 | −1.0638E+00 | 1.6099E+00 | −1.5274E+00 | 8.1892E−01 | −1.8189E−01 | 0 |
| S4 | −1.4370E−01 | 2.8794E−01 | −7.7661E−01 | 1.7014E+00 | −2.6215E+00 | 2.3181E+00 | −8.8852E−01 | 0 |
| S5 | −8.9901E−02 | −4.5815E−02 | −2.3247E−02 | 0 | 0 | 0 | 0 | 0 |
| S6 | −6.0134E−02 | 4.6464E−05 | −7.8916E−02 | 5.4190E−02 | 0 | 0 | 0 | 0 |
| S7 | −6.4395E−02 | 2.1801E−01 | −3.2314E−01 | 2.6246E−01 | −8.4115E−02 | 0 | 0 | 0 |
| S8 | −3.2835E−01 | 4.7779E−01 | −5.3872E−01 | 4.1605E−01 | −1.6523E−01 | 2.0296E−02 | 4.5789E−03 | −1.1097E−03 |
| S9 | −8.5144E−02 | 1.1929E−01 | −1.5989E−01 | 9.0814E−02 | −2.4491E−02 | 3.1003E−03 | −1.3241E−04 | −2.3646E−06 |
| S10 | 6.2894E−03 | 8.1076E−02 | −1.2829E−01 | 7.7382E−02 | −2.5977E−02 | 5.1928E−03 | −5.7529E−04 | 2.6962E−05 |
| S11 | −3.9261E−01 | 2.8810E−01 | −1.2956E−01 | 3.2272E−02 | −2.5605E−03 | −5.7328E−04 | 1.4020E−04 | −8.7706E−06 |
| S12 | −3.4135E−01 | 2.3259E−01 | −1.2287E−01 | 4.3972E−02 | −1.0001E−02 | 1.3633E−03 | −1.0026E−04 | 3.0191E−06 |

Figure 22:
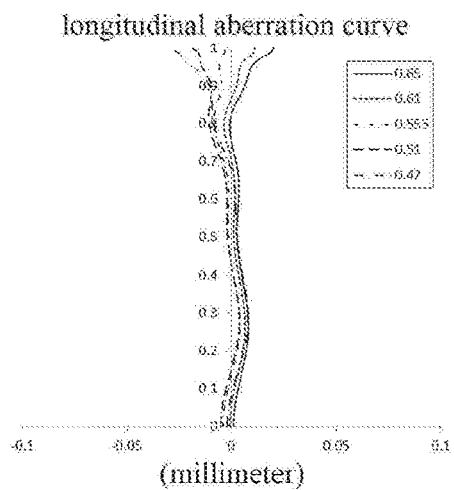
FIGS. 22-25 respectively illustrate a longitudinal aberration curve, an astigmatic curve, a distortion curve and a lateral color curve of the camera lens assembly according to Embodiment 5.
Figure 23:
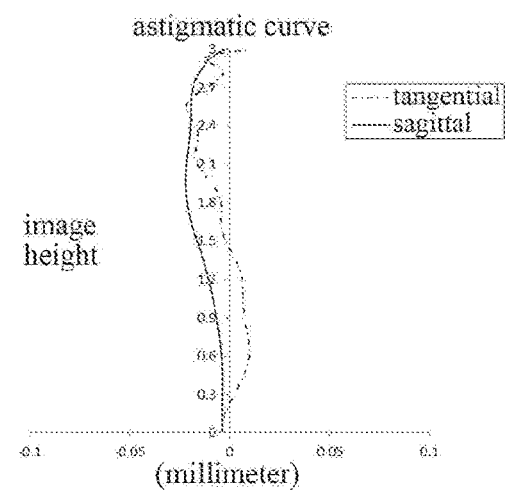
Figure 24:
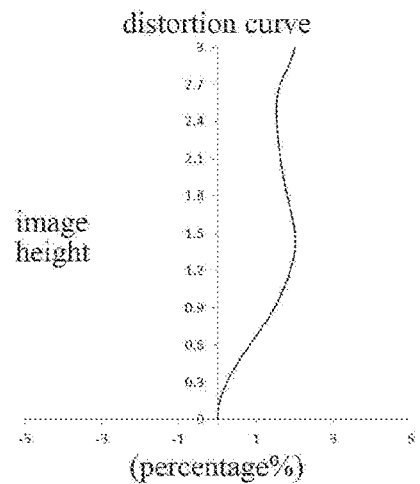
Figure 25:
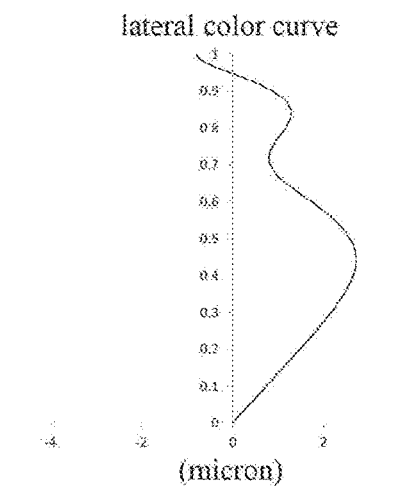

FIG. 22 shows the longitudinal aberration curve of the camera lens assembly according to Embodiment 5, representing deviations of focal points where lights of different wavelengths converge after passing through the optical system. FIG. 23 shows the astigmatic curve of the camera lens assembly according to Embodiment 5, representing a curvature of the tangential image plane and a curvature of the sagittal image plane. FIG. 24 shows the distortion curve of the camera lens assembly according to Embodiment 5, representing degrees of distortion at different viewing angles. FIG. 25 shows the lateral color curve of the camera lens assembly according to Embodiment 5, representing deviations of different heights of images on the image plane formed by light passing through the camera lens assembly. In summary, with reference to FIGS. 22 to 25, the camera lens assembly according to Embodiment 5 can realize the alignment function by grouping the lenses, thereby improving the module process yield and shortening the AF duration.

Embodiment 6

A camera lens assembly according to Embodiment 6 of the present disclosure is described with reference to FIGS. 26 to 30.

Figure 26:
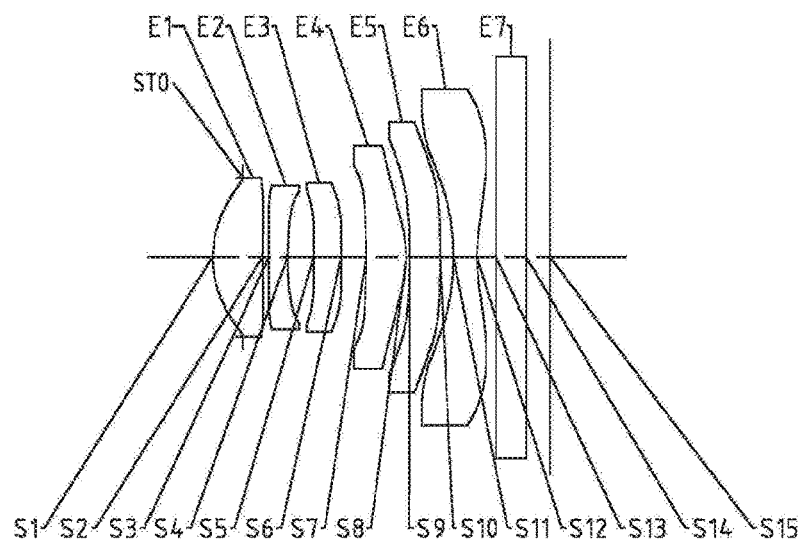
FIG. 26 is a schematic structural diagram illustrating a camera lens assembly according to Embodiment 6.

FIG. 26 is a schematic structural diagram illustrating the camera lens assembly according to Embodiment 6. The camera lens assembly sequentially includes, from an object side to an image side, a first lens E1, a second lens E2, a third lens E3, a fourth lens E4, a fifth lens E5, and a sixth lens E6. The alignment group includes the first lens, the second lens and the third lens, and the fixing group includes the fourth lens, the fifth lens and the sixth lens. The alignment group is adjustable in a direction perpendicular to the optical axis.

The first lens E1 may have a positive refractive power, the object-side surface S1 of the first lens E1 may be a convex surface, and the image-side surface S2 of the first lens E1 may be a concave surface.

The second lens E2 may have a negative refractive power, the object-side surface S3 of the second lens E2 may be a convex surface, and the image-side surface S4 of the second lens E2 may be a concave surface.

The third lens E3 may have a positive refractive power, the object-side surface S5 of the third lens E3 may be a convex surface, and the image-side surface S6 of the third lens E3 may be a concave surface.

The fourth lens E4 may have a positive refractive power, the object-side surface S7 of the fourth lens E4 may be a concave surface, and the image-side surface S8 of the fourth lens E4 may be a convex surface.

The fifth lens E5 may have a negative refractive power, the object-side surface S9 of the fifth lens E5 may be a concave surface, and the image-side surface S10 of the fifth lens E5 may be a convex surface.

The sixth lens E6 may have a negative refractive power, the object-side surface S11 of the sixth lens E6 may be a concave surface, and the image-side surface S12 of the sixth lens E6 may be a concave surface.

Table 16 below shows the effective focal lengths f1 to f6 of the first to sixth lenses E1 to E6, the total effective focal length f of the camera lens assembly, the total track length TTL of the camera lens assembly, and the half of the maximal field-of-view HFOV of the camera lens assembly.

TABLE 16

| f1(mm) | 3.24 | f(mm) | 3.89 |
|---|---|---|---|
| f2(mm) | −8.52 | TTL(mm) | 4.75 |
| f3(mm) | 232.58 | HFOV(°) | 37.3 |
| f4(mm) | 3.32 | | |
| f5(mm) | −32.31 | | |
| f6(mm) | −2.79 | | |

Table 17 below shows the surface type, the radius of curvature, the thickness, the material and the conic coefficient of each lens of the camera lens assembly in the present embodiment. The units of radius of curvature and the thickness are millimeters (mm).

TABLE 17

| surface number | surface type | radius of curvature | thickness | refractive index | abbe number | conic coefficient |
|---|---|---|---|---|---|---|
| OBJ | spherical | infinite | infinite | | | |
| STO | spherical | infinite | −0.4215 | | | |
| S1 | aspheric | 1.5189 | 0.7033 | 1.55 | 56.1 | −2.2162 |
| S2 | aspheric | 8.8533 | 0.0902 | | | −10.6650 |
| S3 | aspheric | 17.3896 | 0.2615 | 1.67 | 20.4 | −24.8576 |
| S4 | aspheric | 4.2606 | 0.3723 | | | −39.9774 |
| S5 | aspheric | 17.2337 | 0.3866 | 1.55 | 56.1 | −1.7000 |
| S6 | aspheric | 19.7788 | 0.3520 | | | −64.2853 |
| S7 | aspheric | −12.2956 | 0.5654 | 1.55 | 56.1 | −69.9000 |
| S8 | aspheric | −1.6084 | 0.0489 | | | −5.9319 |
| S9 | aspheric | −20.6867 | 0.4193 | 1.65 | 23.5 | −1.7000 |
| S10 | aspheric | −2814.2864 | 0.1853 | | | −1.7000 |
| S11 | aspheric | −4.3705 | 0.3300 | 1.54 | 55.9 | −2.0400 |
| S12 | aspheric | 2.3402 | 0.2714 | | | −8.8101 |
| S13 | spherical | infinite | 0.4267 | 1.52 | 64.2 | |
| S14 | spherical | infinite | 0.3371 | | | |
| S15 | spherical | infinite | | | | |

Table 18 below shows the high-order coefficients applicable to the aspheric surfaces S1-S12 of the aspheric lenses in the present embodiment. The surface type of each aspheric surface may be defined by the formula (1) given in the above Embodiment 1.

TABLE 18

| surface number | A4 | A6 | A8 | A10 | A12 | A14 | A16 |
|---|---|---|---|---|---|---|---|
| S1 | 7.6097E−02 | −4.1288E−03 | 1.1765E−02 | −4.0024E−02 | 5.5975E−02 | −4.0403E−02 | 7.1401E−03 |
| S2 | −1.2097E−01 | 1.6125E−01 | −1.9077E−01 | 2.3140E−01 | −2.7208E−01 | 1.8039E−01 | −4.8164E−02 |
| S3 | −1.6484E−01 | 3.3670E−01 | −3.0438E−01 | 2.7217E−01 | −3.0092E−01 | 2.5561E−01 | −8.4041E−02 |
| S4 | −1.5744E−02 | 2.1635E−01 | −1.6109E−01 | 7.4905E−02 | 1.4008E−01 | −2.6768E−01 | 2.0708E−01 |
| S5 | −1.8697E−01 | 4.0187E−02 | −1.3563E−01 | 3.1726E−01 | −4.0679E−01 | 2.4225E−01 | 3.8795E−03 |
| S6 | −1.5224E−01 | 2.3732E−02 | −1.5605E−01 | 2.6391E−01 | −2.0808E−01 | 8.4998E−02 | −6.3458E−03 |
| S7 | 1.6410E−02 | 5.8831E−03 | −1.0767E−01 | 9.9776E−02 | −4.3953E−02 | 9.7151E−03 | −8.4653E−04 |
| S8 | 1.1380E−02 | 1.4236E−02 | 6.5955E−03 | −1.1463E−02 | 3.9781E−03 | −5.6013E−04 | 2.8756E−05 |
| S9 | −4.1037E−02 | −4.4802E−02 | 6.5451E−02 | −3.8033E−02 | 1.1575E−02 | −1.7612E−03 | 1.0546E−04 |
| S10 | −7.5611E−02 | 1.4226E−02 | 6.9872E−03 | −5.8613E−03 | 1.8769E−03 | −2.7995E−04 | 1.5725E−05 |
| S11 | −6.7690E−02 | 1.3466E−02 | 1.5191E−02 | −8.1489E−03 | 1.7335E−03 | −1.7544E−04 | 6.8763E−06 |
| S12 | −8.0559E−02 | 3.9931E−02 | −1.4768E−02 | 3.6056E−03 | −5.5786E−04 | 4.7955E−05 | −1.6877E−06 |

Figure 27:
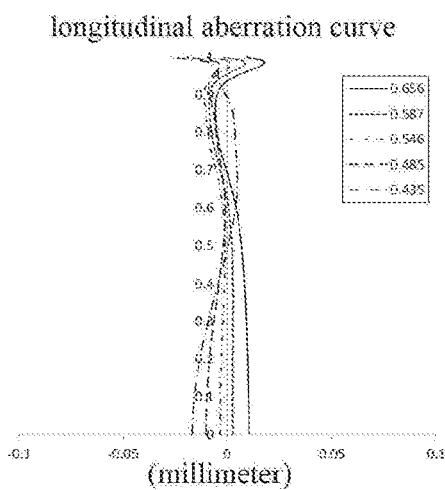
FIGS. 27-30 respectively illustrate a longitudinal aberration curve, an astigmatic curve, a distortion curve and a lateral color curve of the camera lens assembly according to Embodiment 6.
Figure 28:
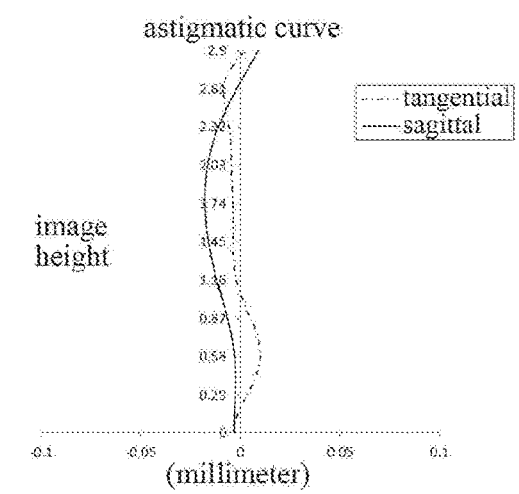
Figure 29:
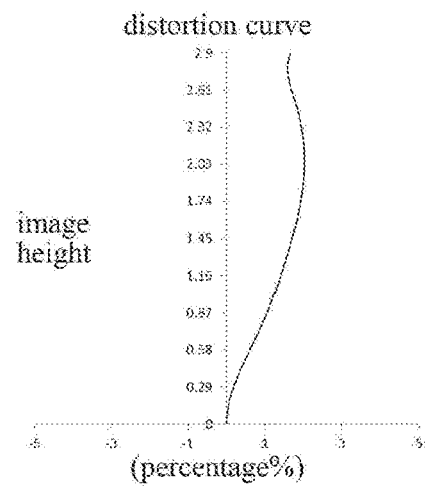
Figure 30:
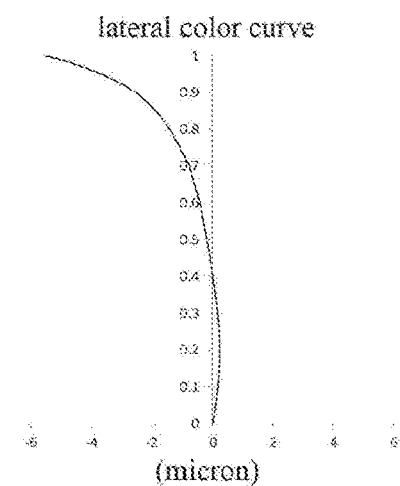

FIG. 27 shows the longitudinal aberration curve of the camera lens assembly according to Embodiment 6, representing deviations of focal points where lights of different wavelengths converge after passing through the optical system. FIG. 28 shows the astigmatic curve of the camera lens assembly according to Embodiment 6, representing a curvature of the tangential image plane and a curvature of the sagittal image plane. FIG. 29 shows the distortion curve of the camera lens assembly according to Embodiment 6, representing degrees of distortion at different viewing angles. FIG. 30 shows the lateral color curve of the camera lens assembly according to Embodiment 6, representing deviations of different heights of images on the image plane formed by light passing through the camera lens assembly. In summary, with reference to FIGS. 27 to 30, the camera lens assembly according to Embodiment 6 can realize the alignment function by grouping the lenses, thereby improving the module process yield and shortening the AF duration.

Embodiment 7

A camera lens assembly according to Embodiment 7 of the present disclosure is described with reference to FIGS. 31 to 35.

Figure 31:
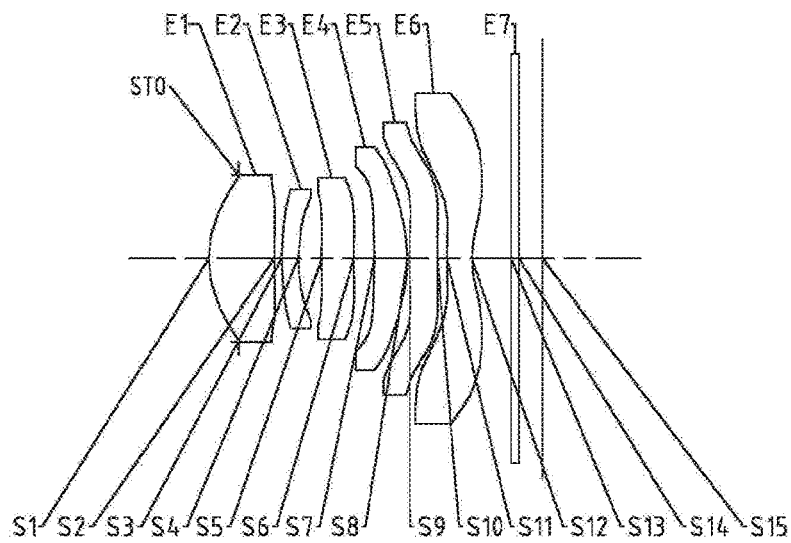
FIG. 31 is a schematic structural diagram illustrating a camera lens assembly according to Embodiment 7.

FIG. 31 is a schematic structural diagram illustrating the camera lens assembly according to Embodiment 7. The camera lens assembly sequentially includes, from an object side to an image side, a first lens E1, a second lens E2, a third lens E3, a fourth lens E4, a fifth lens E5, and a sixth lens E6. The alignment group includes the first lens, and the fixing group includes the second lens, the third lens, the fourth lens, the fifth lens and the sixth lens. The alignment group is adjustable in a direction perpendicular to the optical axis.

The first lens E1 may have a positive refractive power, the object-side surface S1 of the first lens E1 may be a convex surface, and the image-side surface S2 of the first lens E1 is a concave surface.

The second lens E2 may have a negative refractive power, the object-side surface S3 of the second lens E2 may be a convex surface, and the image-side surface S4 of the second lens E2 may be a concave surface.

The third lens E3 may have a positive refractive power, the object-side surface S5 of the third lens E3 may be a convex surface, and the image-side surface S6 of the third lens E3 may be a concave surface.

The fourth lens E4 may have a positive refractive power, the object-side surface S7 of the fourth lens E4 may be a concave surface, and the image-side surface S8 of the fourth lens E4 may be a convex surface.

The fifth lens E5 may have a positive refractive power, the object-side surface S9 of the fifth lens E5 may be a flat surface, and the image-side surface S10 of the fifth lens E5 may be a convex surface.

The sixth lens E6 may have a negative refractive power, the object-side surface S11 of the sixth lens E6 may be a convex surface, and the image-side surface S12 of the sixth lens E6 may be a concave surface.

Table 19 below shows the effective focal lengths f1 to f6 of the first to sixth lenses E1 to E6, the total effective focal length f of the camera lens assembly, the total track length TTL of the camera lens assembly, and the half of the maximal field-of-view HFOV of the camera lens assembly.

TABLE 19

| f1(mm) | 3.82 | f(mm) | 3.98 |
|---|---|---|---|
| f2(mm) | −13.25 | TTL(mm) | 4.75 |
| f3(mm) | 230.91 | HFOV(°) | 37.2 |
| f4(mm) | 4.65 | | |
| f5(mm) | 72.40 | | |
| f6(mm) | −3.27 | | |

Table 20 below shows the surface type, the radius of curvature, the thickness, the material and the conic coefficient of each lens of the camera lens assembly in the present embodiment. The units of radius of curvature and the thickness are millimeters (mm).

TABLE 20

| surface number | surface type | radius of curvature | thickness | material refractive index | abbe number | conic coefficient |
|---|---|---|---|---|---|---|
| OBJ | spherical | infinite | infinite | | | |
| STO | spherical | infinite | −0.4187 | | | |
| S1 | aspheric | 1.6242 | 0.9309 | 1.50 | 81.6 | −2.7162 |
| S2 | aspheric | 9.2159 | 0.1043 | | | −69.9000 |
| S3 | aspheric | 2.9901 | 0.2400 | 1.67 | 20.4 | −15.6913 |
| S4 | aspheric | 2.1630 | 0.3326 | | | −15.5077 |
| S5 | aspheric | 9.0274 | 0.4616 | 1.55 | 56.1 | −23.8969 |
| S6 | aspheric | 9.5472 | 0.2949 | | | −61.0322 |
| S7 | aspheric | −7.5808 | 0.4720 | 1.54 | 55.9 | −23.8512 |
| S8 | aspheric | −1.9191 | 0.0300 | | | −9.8142 |
| S9 | aspheric | infinite | 0.3831 | 1.65 | 23.5 | −1.7000 |
| S10 | aspheric | −46.6777 | 0.1345 | | | −69.9000 |
| S11 | aspheric | 3.5248 | 0.3538 | 1.54 | 55.9 | −69.9000 |
| S12 | aspheric | 1.1317 | 0.5652 | | | −6.9081 |
| S13 | spherical | infinite | 0.1100 | 1.52 | 64.2 | |
| S14 | spherical | infinite | 0.3371 | | | |
| S15 | spherical | infinite | | | | |

Table 21 below shows the high-order coefficients applicable to the aspheric surfaces S1-S12 of the aspheric lenses in the present embodiment. The surface type of each aspheric surface may be defined by the formula (1) given in the above Embodiment 1.

TABLE 21

| surface number | A4 | A6 | A8 | A10 | A12 | A14 | A16 |
|---|---|---|---|---|---|---|---|
| S1 | 6.8227E−02 | −1.1518E−02 | −1.1816E−02 | 2.4427E−02 | −2.6633E−02 | 1.2275E−02 | −2.7202E−03 |
| S2 | −1.2625E−01 | 1.8691E−01 | −1.9308E−01 | 7.4506E−02 | 5.8693E−03 | −9.6416E−03 | 5.8356E−04 |
| S3 | −1.1812E−01 | 2.6001E−01 | −2.3607E−01 | 2.0256E−01 | −2.6072E−01 | 2.4229E−01 | −8.1989E−02 |
| S4 | 6.5486E−02 | −5.3632E−02 | 3.9159E−01 | −8.5693E−01 | 1.1526E+00 | −9.1779E−01 | 3.5398E−01 |
| S5 | −1.1739E−01 | −1.2218E−01 | 6.7447E−01 | −1.9742E+00 | 3.2062E+00 | −2.7486E+00 | 9.7461E−01 |
| S6 | −7.6699E−02 | −9.4702E−03 | −1.2840E−01 | 2.0427E−01 | −1.5716E−01 | 5.6057E−02 | −2.1937E−03 |
| S7 | 1.8498E−01 | 1.7299E−01 | −4.7350E−01 | 4.7714E−01 | −2.6756E−01 | 7.4336E−02 | −6.8220E−03 |
| S8 | 5.7537E−03 | 7.3887E−02 | −2.4090E−01 | 2.6763E−01 | −1.4389E−01 | 3.7750E−02 | −3.9006E−03 |
| S9 | 1.8721E−01 | −3.9636E−01 | 2.5939E−01 | −1.0308E−01 | 2.9887E−02 | −5.4309E−03 | 4.2185E−04 |
| S10 | 1.8361E−01 | −3.8288E−01 | 2.7470E−01 | −1.1433E−01 | 2.9185E−02 | −4.1006E−03 | 2.3717E−04 |
| S11 | −2.4432E−01 | 2.8030E−02 | 7.3817E−02 | −4.3451E−02 | 1.0863E−02 | −1.3117E−03 | 6.2210E−05 |
| S12 | −1.9598E−01 | 1.1947E−01 | −4.3589E−02 | 9.5162E−03 | −1.2232E−03 | 7.9791E−05 | −1.5884E−06 |

Figure 32:
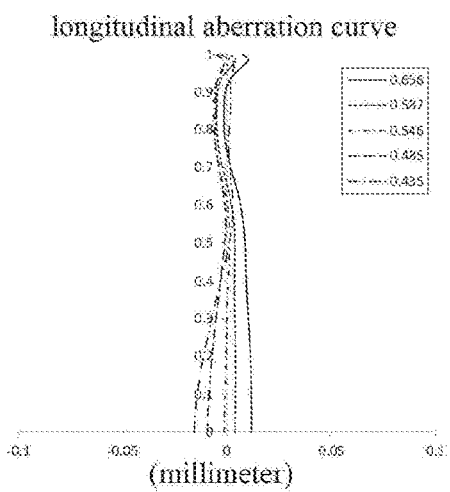
FIGS. 32-35 respectively illustrate a longitudinal aberration curve, an astigmatic curve, a distortion curve and a lateral color curve of the camera lens assembly according to Embodiment 7.
Figure 33:
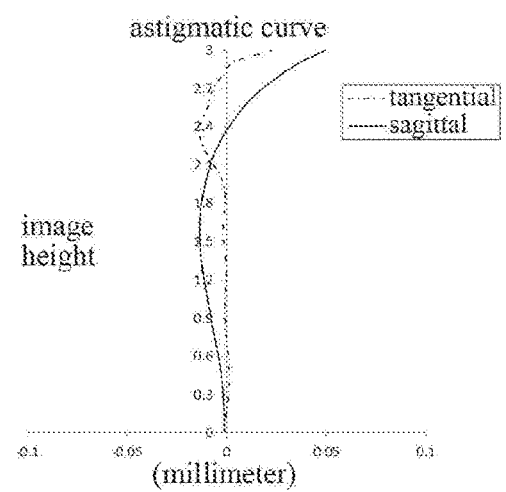
Figure 34:
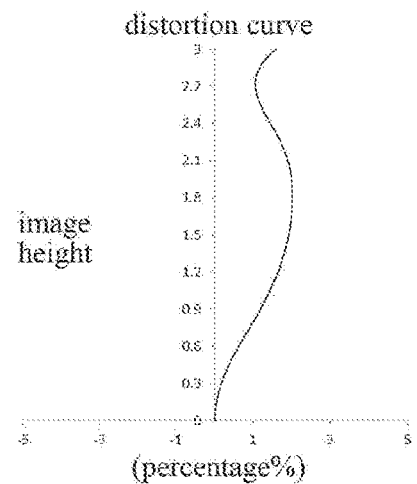
Figure 35:
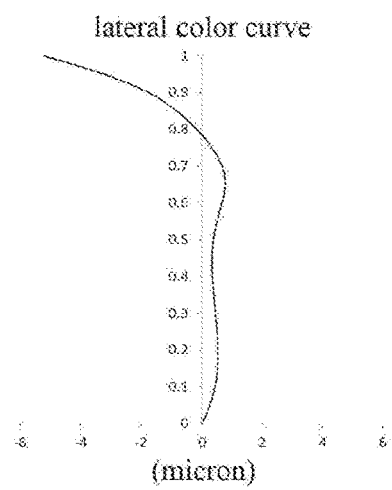

FIG. 32 shows the longitudinal aberration curve of the camera lens assembly according to Embodiment 7, representing deviations of focal points where lights of different wavelengths converge after passing through the optical system. FIG. 33 shows the astigmatic curve of the camera lens assembly according to Embodiment 7, representing a curvature of the tangential image plane and a curvature of the sagittal image plane. FIG. 34 shows the distortion curve of the camera lens assembly according to Embodiment 7, representing degrees of distortion at different viewing angles. FIG. 35 shows the lateral color curve of the camera lens assembly according to Embodiment 7, representing deviations of different heights of images on the image plane formed by light passing through the camera lens assembly. In summary, with reference to FIGS. 31 to 35, the camera lens assembly according to Embodiment 7 can realize the alignment function by grouping the lenses, thereby improving the module process yield and shortening the AF duration.

To sum up, in the Embodiments 1 to 7, the conditional expressions satisfy the conditions in Table 22 below.

TABLE 22

| conditional expression | embodiment | | | | | | |
|---|---|---|---|---|---|---|---|
| | 1 | 2 | 3 | 4 | 5 | 6 | 7 |
| fa/f | 0.80 | 1.07 | 1.07 | 1.15 | 1.92 | 1.14 | 0.96 |
| f/EPD | 2.67 | 1.69 | 1.79 | 2.05 | 1.69 | 1.75 | 1.68 |
| ETa | 0.33 | 0.29 | 0.34 | 0.19 | 0.24 | 0.32 | 0.27 |
| f/TTL | 1.12 | 0.82 | 0.86 | 0.86 | 0.82 | 0.82 | 0.84 |
| f/|fb| | 0.99 | 0.24 | 0.34 | 0.11 | 0.75 | 0.13 | 0.48 |
| f/fbi | −0.20 | −0.49 | −1.62 | −0.88 | −0.40 | −1.40 | −1.22 |
| V1/(V1 + V2) | 0.73 | 0.73 | 0.73 | 0.70 | 0.73 | 0.73 | 0.80 |

The foregoing is only a description for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the invention, such as technical solutions formed by replacing the features as disclosed in the present disclosure with (but not limited to) technical features with similar functions.

What is claimed is:

1. A camera lens assembly sequentially comprising, from an object side to an image side of the camera lens assembly:
   a first lens, having a positive refractive power;
   a second lens, having a negative refractive power;
   a third lens, having a positive refractive power;
   a fourth lens;
   a fifth lens; and
   a sixth lens, having a negative refractive power,
   wherein the first to the sixth lenses form an alignment group and a fixing group, the alignment group has a positive refractive power and comprises at least the first lens, the fixing group comprises at least the sixth lens;
   wherein an effective focal length fa of the alignment group and an effective focal length f of the camera lens assembly satisfy: 0.6<fa/f<2.0,
   wherein the alignment group is adjustable in a direction perpendicular to an optical axis of the camera lens assembly,
   wherein the effective focal length f of the camera lens assembly and an axial distance TTL from an object-side surface of a positive lens closest to the object side in the alignment group to an image plane satisfy: $0.8 \leq f/TTL \leq 1.2$,
   wherein an entrance pupil diameter EPD of the camera lens assembly and the effective focal length f of the camera lens assembly satisfy: $1.6 \leq f/EPD \leq 2.05$, and
   wherein the camera lens assembly has and only has six lenses having refractive power.

2. The camera lens assembly according to claim 1, wherein an edge thickness ETa between the alignment group and the fixing group at positions where radiuses are maximum satisfies: 0.15 mm<ETa<0.5 mm.

3. The camera lens assembly according to claim 2, wherein the effective focal length f of the camera lens assembly and an effective focal length fb of the fixing group satisfy: $f/|fb| \leq 1.0$.

4. The camera lens assembly according to claim 3, wherein the effective focal length f of the camera lens assembly and an effective focal length fbi of a negative lens closest to the image side in the fixing group satisfy: −2.0<f/fbi<0.

5. The camera lens assembly according to claim 1, wherein a dispersion coefficient V1 of the positive lens closest to the object side in the alignment group and a dispersion coefficient V2 of a negative lens adjacent to the positive lens satisfy: 0.5<V1/(V1+V2)<1.

6. A camera lens assembly sequentially comprising, from an object side to an image side of the camera lens assembly:
   a first lens, having a positive refractive power;
   a second lens, having a negative refractive power;
   a third lens, having a positive refractive power;
   a fourth lens;
   a fifth lens; and
   a sixth lens, having a negative refractive power, wherein the first to the sixth lenses form an alignment group and a fixing group, the alignment group has a positive refractive power and comprises at least the first lens, the fixing group comprises at least the sixth lens;

wherein a dispersion coefficient V1 of a positive lens closest to the object side in the alignment group and a dispersion coefficient V2 of a negative lens adjacent to the positive lens satisfy: 0.5<V1/(V1+V2)<1, wherein the alignment group is adjustable in a direction perpendicular to an optical axis of the camera lens assembly, wherein the effective focal length f of the camera lens assembly and an axial distance TTL from an object-side surface of a positive lens closest to the object side in the alignment group to an image plane satisfy: 0.8≤f/TTL≤1.2, wherein an entrance pupil diameter EPD of the camera lens assembly and the effective focal length f of the camera lens assembly satisfy: 1.6≤f/EPD≤2.05, and wherein the camera lens assembly has and only has six lenses having refractive power.

7. The camera lens assembly according to claim 6, wherein an effective focal length fa of the alignment group and an effective focal length f of the camera lens assembly satisfy: 0.6<fa/f<2.0.

8. The camera lens assembly according to claim 6, wherein an edge thickness ETa between the alignment group and the fixing group at positions where radiuses are maximum satisfies: 0.15 mm<ETa<0.5 mm.

9. The camera lens assembly according to claim 6, wherein the effective focal length f of the camera lens assembly and an effective focal length fb of the fixing group satisfy: f/|fb|≤1.0.

10. The camera lens assembly according to claim 9, wherein the effective focal length f of the camera lens assembly and an effective focal length fbi of a negative lens closest to the image side in the fixing group satisfy: −2.0<f/fbi<0.

11. A camera lens assembly sequentially comprising, from an object side to an image side of the camera lens assembly:

a first lens, having a positive refractive power;

a second lens, having a negative refractive power;

a third lens, having a positive refractive power;

a fourth lens;

a fifth lens; and a sixth lens, having a negative refractive power, wherein the first to the sixth lenses form an alignment group and a fixing group, the alignment group has a positive refractive power and comprises at least the first lens, the fixing group comprises at least the sixth lens;

wherein an edge thickness ETa between the alignment group and the fixing group at positions where radiuses are maximum satisfies: 0.15 mm<ETa<0.5 mm, wherein the alignment group is adjustable in a direction perpendicular to an optical axis of the camera lens assembly, wherein the effective focal length f of the camera lens assembly and an axial distance TTL from an object-side surface of a positive lens closest to the object side in the alignment group to an image plane satisfy: 0.8≤f/TTL≤1.2, wherein an entrance pupil diameter EPD of the camera lens assembly and the effective focal length f of the camera lens assembly satisfy: 1.6≤f/EPD≤2.05, and wherein the camera lens assembly has and only has six lenses having refractive power.

12. The camera lens assembly according to claim 11, wherein an effective focal length fa of the alignment group and an effective focal length f of the camera lens assembly satisfy: 0.6<fa/f<2.0.

13. The camera lens assembly according to claim 11, wherein an effective focal length f of the camera lens assembly and an effective focal length fb of the fixing group satisfy: f/|fb|≤1.0.

14. The camera lens assembly according to claim 13, wherein the effective focal length f of the camera lens assembly and an effective focal length fbi of a negative lens closest to the image side in the fixing group satisfy: −2.0<f/fbi<0, wherein a dispersion coefficient V1 of a positive lens closest to the object side in the alignment group and a dispersion coefficient V2 of a negative lens adjacent to the positive lens satisfy: 0.5<V1/(V1+V2)<1.

* * * * *